United States Patent
Otomo et al.

(10) Patent No.: US 8,691,921 B2
(45) Date of Patent: Apr. 8, 2014

(54) POLYURETHANE AND MANUFACTURING METHOD THEREFOR, MASTER BATCH, INK BINDER, INK COMPOSITION, THERMOPLASTIC POLYMER COMPOSITION FOR MOLDING, MOLDED BODY, AND COMPOSITE MOLDED BODY AND MANUFACTURING METHOD THEREFOR

(75) Inventors: Takayoshi Otomo, Chiba (JP); Yuichi Tsuji, Chiba (JP); Katsumi Kihara, Ichikawa (JP); Hidekazu Saito, Fuwa-gun (JP); Yoshihiro Yamana, Tokyo (JP); Kazumasa Hattori, Kamisu (JP)

(73) Assignee: Dow Corning Toray Co., Ltd., Chiyoda-Ku, Tokyo (JP)

( * ) Notice: Subject to any disclaimer, the term of this patent is extended or adjusted under 35 U.S.C. 154(b) by 129 days.

(21) Appl. No.: 13/266,583

(22) PCT Filed: Apr. 30, 2010

(86) PCT No.: PCT/JP2010/003094
§ 371 (c)(1),
(2), (4) Date: Oct. 27, 2011

(87) PCT Pub. No.: WO2010/125828
PCT Pub. Date: Nov. 4, 2010

(65) Prior Publication Data
US 2012/0041141 A1 Feb. 16, 2012

(30) Foreign Application Priority Data
Apr. 30, 2009 (JP) ................................ 2009-111520

(51) Int. Cl.
*C08L 83/06* (2006.01)
(52) U.S. Cl.
USPC ........................................................ 525/474
(58) Field of Classification Search
USPC ........................................................ 525/474
See application file for complete search history.

(56) References Cited

U.S. PATENT DOCUMENTS

| | | | |
|---|---|---|---|
| 6,384,171 B1 | 5/2002 | Yamazaki et al. |
| 7,737,242 B2 | 6/2010 | Ziche et al. |
| 2004/0214911 A1 | 10/2004 | DeSaw et al. |

FOREIGN PATENT DOCUMENTS

| | | |
|---|---|---|
| JP | 08-174604 A | 7/1996 |
| JP | 10-101766 A | 4/1998 |
| JP | 10-139963 A | 5/1998 |
| JP | 2001-026648 A | 1/2001 |
| JP | 2001-026748 A | 1/2001 |
| JP | 2001-335624 A | 12/2001 |
| JP | 2002-037842 A | 2/2002 |
| JP | 2002-206071 A | 7/2002 |
| JP | 2004-002816 A | 1/2004 |
| JP | 2008-510865 A | 4/2008 |

OTHER PUBLICATIONS

English language abstract and translation for JP 08-174604 extracted from the PAJ database on Feb. 13, 2012, 52 pages.
English language abstract and translation for JP 10-101766 extracted from the PAJ database on Feb. 15, 2012, 30 pages.
English language abstract and translation for JP 10-139963 extracted from the PAJ database on Feb. 15, 2012, 29 pages.
English language abstract and translation for JP 2001-026648 extracted from the PAJ database on Feb. 13, 2012, 46 pages.
English language abstract and translation for JP 2001-026748 extracted from the PAJ database on Feb. 15, 2012, 47 pages.
English language abstract and translation for JP 2001-335624 extracted from the PAJ database on Feb. 15, 2012, 35 pages.
English language abstract and translation for JP 2002-037842 extracted from the PAJ database on Feb. 15, 2012, 48 pages.
English language abstract and translation for JP 2002-206071 extracted from the PAJ database on Feb. 15, 2012, 41 pages.
No English language abstract found for JP 2008-510865; however, see English language equivalent US 7,737,242. Original foreign language document extracted from espacenet.com database on Feb. 15, 2012, 28 pages.
International Search Report for Application No. PCT/JP2010/003094 dated Aug. 17, 2010, 5 pages.
English language abstract and machine-assisted English translation for JP 2004-002816 extracted from the PAJ database on Nov. 18, 2013, 69 pages.

*Primary Examiner* — Kuo-Liang Peng
(74) *Attorney, Agent, or Firm* — Howard & Howard Attorneys PLLC

(57) ABSTRACT

The present invention provides a polyurethane which is non-sticky, exhibits superior handling properties and superior moldability, and has superior adhesive properties with silicones even if a surface activation treatment is not carried out beforehand. The polyurethane of the present invention contains polyol units and organic polyisocyanate units. The polyol units contain an alkenyl group-containing organopolysiloxane structure in an amount ranging from 0.01 to 20% by weight with respect to the weight of the aforementioned polyurethane.

23 Claims, No Drawings

POLYURETHANE AND MANUFACTURING METHOD THEREFOR, MASTER BATCH, INK BINDER, INK COMPOSITION, THERMOPLASTIC POLYMER COMPOSITION FOR MOLDING, MOLDED BODY, AND COMPOSITE MOLDED BODY AND MANUFACTURING METHOD THEREFOR

RELATED APPLICATIONS

This application claims priority to and all the advantages of International Patent Application No. PCT/JP2010/003094, filed on Apr. 30, 2010, which claims priority to Japanese Patent Application No. JP2009-11520, filed on Apr. 30, 2009.

TECHNICAL FIELD

The present invention relates to a polyurethane and a manufacturing method therefor, a master batch and an ink binder containing the aforementioned polyurethane, an ink composition containing the aforementioned ink binder, a thermoplastic polymer composition for molding containing the aforementioned polyurethane, a molded body containing the aforementioned polyurethane or the aforementioned thermoplastic polymer composition, a composite molded body comprising a polyurethane and a silicone and a manufacturing method therefor.

BACKGROUND ART

Polyurethanes have superior properties such as mechanical properties, abrasion resistance, elasticity recovery properties, oil resistance, flexibility and the like, and can be easily melt-molded. For this reason, polyurethanes have been widely used as alternative materials of conventional synthetic rubber or plastics.

However, polyurethanes exhibit strong stickiness. For this reason, for example, in the case of manufacturing a molded body by means of injection molding, problems easily occur such as poor release from a mold, poor outer appearance of a molded body caused by flow spots of a resin in a mold such as occurrences of air bubbles or flow patterns, conglutination among the obtained molded bodies, and the like. In addition, in the case of manufacturing a film or sheet by means of extrusion molding or the like, it is difficult to roll up the film or sheet itself, and for this reason, a mold release agent or an release coated paper (mold release sheet) must be used together therewith. If the film or sheet is rolled up itself without using a mold release agent or an release coated paper, it becomes difficult to roll out the rolled film or sheet. In addition, polyurethanes exhibit poor hot-water resistance or poor weather resistance.

For this reason, although polyurethanes have the aforementioned superior properties, the usage range thereof is restricted under present circumstances.

Silicones exhibit good mold release properties, have increased thermal resistance, cold resistance and weather resistance, exhibit superior water repellency and electrical insulation properties, and express stable physical properties even at widely ranging temperatures. In view of this, silicones have been used in various fields by utilizing the aforementioned properties.

However, silicones have disadvantages such as poor mechanical properties, or poor abrasion resistance, and the usage range thereof is restricted under present circumstances.

Recently, in order to compensate the disadvantages of both polyurethanes and silicones, composite molded bodies in which polyurethanes and silicones are compounded have been developed. The composite molded bodies are applied to, for example, key sheet for use in push-button switches of mobile phones, personal electronics, automobile parts, communication devices, and the like.

However, molded bodies or layers obtained from polyurethanes exhibit insufficient surface activities. For this reason, in the case of laminating silicones, the surface of the molded bodies or layers must be preliminarily subjected to a surface-activation treatment. As the aforementioned surface-activation treatment, a primer treatment, a corona discharge treatment, a plasma treatment, an ozone treatment, a flame treatment or the like is known. However, there is a problem in that a reduction of productivity or reduction of work efficiency may be caused by any of the means described above.

In order to solve the aforementioned problems, a process for integral-molding thermoplastic resins and silicone resins by means of an injection molding machine is proposed (Patent Document 1). In addition, a coating agent of a polyurethane in which adhesion to a silicone rubber is improved is proposed (Patent Documents 2 to 4).

However, in the case of using a polyurethane as the thermoplastic resin in the process described in Patent Document 1 and in the coating agents described in Patent Documents 2 to 4, adhesion between polyurethanes and silicones is insufficient, and for this reason, a composite molded body which combine both superior properties of polyurethanes and silicones can not be obtained.

LIST OF PRIOR ART DOCUMENTS

Patent Documents

Patent Document 1: Japanese Unexamined Patent Application, First Publication No. H8-174604
Patent Document 2: Japanese Unexamined Patent Application, First Publication No. 2001-26648
Patent Document 3: Japanese Unexamined Patent Application, First Publication No. 2001-26748
Patent Document 4: Japanese Unexamined Patent Application, First Publication No. 2002-206071

DISCLOSURE OF INVENTION

Technical Problems

An objective of the present invention is to provide a polyurethane exhibiting superior handling properties and superior molding properties without stickiness, and having increased adhesive properties with silicones even in the case of preliminarily carrying out no surface-activation treatments, and provide a thermoplastic polymer composition for molding which contains the aforementioned polyurethane.

In addition, an objective of the present invention is to provide a master batch, an ink binder, and an ink composition, which contain the aforementioned polyurethane, and can form a resin material or film exhibiting increased adhesive properties with silicones even in the case of carrying out no surface activation treatments.

In addition, an objective of the present invention is to provide a molded body, in which the aforementioned polyurethane or the aforementioned thermoplastic polymer composition for molding is used, and increased adhesive properties with silicones are exhibited even in the case of carrying out no surface activation treatments.

In addition, an objective of the present invention is to provide a composite molded body exhibiting superior adhesive properties between a member containing a polyurethane and a member containing a silicone.

As a result of diligent studies, the present inventors discovered that the aforementioned objectives can be achieved by providing, in a polyurethane, a specified alkenyl group grafted on the main chain of the polyurethane, in a specified range. After further studying on the basis of the aforementioned discovery, the present inventors completed the present invention.

Technical Solution (1) A polyurethane characterized by comprising polyol units and organic polyisocyanate units, wherein the aforementioned polyol unit contains a polyol unit having an alkenyl group-containing organopolysiloxane structure and a ratio of the aforementioned alkenyl group-containing organopolysiloxane structure ranges from 0.01 to 20% by weight (mass) with respect to the weight of the aforementioned polyurethane.

(2) The polyurethane as recited in (1), wherein the aforementioned alkenyl group-containing organopolysiloxane structure is derived from an alkenyl group-containing diorganopolysiloxane of which both terminals of a molecular chain are capped with hydroxyl groups.

(3) The polyurethane as recited in (2), wherein the hydroxyl groups present at both terminals which the aforementioned alkenyl group-containing diorganopolysiloxane has, of which both terminals of a molecular chain are capped with hydroxyl groups, are silicon atom-bonding hydroxyl groups or hydroxyl groups of silicon atom-bonding carbinol groups.

(4) The polyurethane as recited in any one of (1) to (3), wherein an amount of the alkenyl group in the aforementioned alkenyl group-containing organopolysiloxane structure ranges from 1 to 56% by weight.

(5) A block copolymer-type polyurethane characterized in that the block copolymer-type polyurethane is a block copolymer having (I) a block derived from the polyurethane as recited in any one of (1) to (4), and (II) a block derived from an addition block copolymer having (A) a polymer block containing an aromatic vinyl compound unit and (B) a copolymer block containing a conjugated diene unit, or a hydrogen additive of the aforementioned addition block copolymer, wherein a ratio of the aforementioned alkenyl group-containing organopolysiloxane structure contained in the aforementioned (I) block ranges from 0.01 to 20% by weight with respect to the weight of the aforementioned block copolymer-type polyurethane.

(6) A process for manufacturing a polyurethane characterized by reacting a polymer polyol and an organic polyisocyanate, and optionally a chain extender by means of a catalyst for a urethane-forming catalyst, wherein as at least one part of the aforementioned polymer polyol and/or chain extender, an alkenyl group-containing diorganopolysiloxane of which both terminals of a molecular chain are capped with hydroxyl groups is used in an amount ranging from 0.01 to 20% by weight with respect to the weight of the obtained polyurethane.

(7) A process for manufacturing a block copolymer-type polyurethane characterized by reacting a polymer polyol and an organic polyisocyanate, and optionally a chain extender in the presence of (II') a functional group-containing block copolymer by means of a catalyst for a urethane-forming reaction, wherein the aforementioned (II') functional group-containing block copolymer is a block copolymer having (A) a polymer block containing an aromatic vinyl compound unit and (B) a polymer block containing a conjugated diene unit, or a hydrogen additive of the aforementioned block copolymer, and is a block copolymer having a functional group reactable with the polymer polyol and/or the organic polyisocyanate, and wherein as at least one part of the aforementioned polymer polyol and/or chain extender, an alkenyl group-containing diorganopolysiloxane of which both terminals of a molecular chain are capped with hydroxyl groups is used in an amount ranging from 0.01 to 20% by weight with respect to the weight of the obtained block copolymer-type polyurethane.

(8) The process for manufacturing a polyurethane or a block copolymer-type polyurethane as recited in (6) or (7), wherein the aforementioned catalyst for a urethane-forming reaction is at least one compound selected from the group consisting of organic zinc-based compounds, organic bismuth-based compounds, organic titanium-based compounds and organic zirconium-based compounds.

(9) An ink binder comprising the polyurethane or block copolymer-type polyurethane as recited in any one of (1) to (5).

(10) The ink binder as recited in (9), wherein the aforementioned polyurethane or block copolymer-type polyurethane has an amino group in a molecule, and an amine value of the aforementioned polyurethane or block copolymer-type polyurethane with respect to 1 g of the aforementioned polyurethane or block copolymer-type polyurethane ranges from 0.2 to 20 KOH mg.

(11) An ink composition comprising the ink binder as recited in (9) or (10), a coloring agent, and an organic solvent.

(12) A master batch comprising the polyurethane or block copolymer-type polyurethane as recited in any one of (1) to (5).

(13) A thermoplastic polymer composition for molding comprising the polyurethane or block copolymer-type polyurethane as recited in any one of (1) to (5), and a thermoplastic polymer other than the aforementioned polyurethane or block copolymer-type polyurethane.

(14) The thermoplastic polymer composition for molding as recited in (13), wherein the aforementioned other thermoplastic polymer is a polar polymer.

(15) A thermoplastic polymer composition for molding comprising the block copolymer-type polyurethane as recited in (5) and a thermoplastic polymer other than the aforementioned block copolymer-type polyurethane, wherein the aforementioned other thermoplastic polymer is a non-polar polymer.

(16) The thermoplastic polymer composition for molding as recited in any one of (13) to (15), wherein the aforementioned polyurethane or block copolymer-type polyurethane has the aforementioned alkenyl group-containing organopolysiloxane structure in an amount ranging from 0.02 to 3% by weight with respect to weight of the aforementioned thermoplastic polymer composition for molding.

(17) A molded body having a member containing the polyurethane or block copolymer-type polyurethane as recited in any one of (1) to (5).

(18) A molded body having a member containing the thermoplastic polymer composition for molding as recited in any one of (13) to (16).

(19) The molded body as recited in (17) or (18), which is a film or sheet.

(20) A composite molded body comprising the molded body as recited in any one of (17) to (19) and a member containing a silicone, wherein the aforementioned member containing a silicone contacts a member containing the aforementioned polyurethane or block copolymer-type polyurethane of the aforementioned molded body or a member containing the aforementioned thermoplastic polymer composition for molding of the aforementioned molded body.

(21) A process for manufacturing a composite molded body comprising the steps of supplying a curable silicone composition on the surface of a member formed using the polyurethane or block copolymer-type polyurethane as recited in any one of (1) to (5) or the thermoplastic polymer composition for molding as recited in any one of (13) to (16).

(22) A process for manufacturing a composite molded body comprising the steps of supplying a curable silicone composition on the surface of a film formed using the ink composition as recited in (11).

Effects of the Invention

The polyurethanes and thermoplastic polymer compositions for molding according to the present invention exhibit superior handling properties and superior molding properties without stickiness, and can provide increased adhesive properties with silicones even in the case of preliminarily carrying out no surface activation treatments.

In accordance with the process for manufacturing a polyurethane of the present invention, polyurethanes as described above can be easily manufactured.

In accordance with the master batch of the present invention, a resin material exhibiting superior adhesive properties with silicones can be easily manufactured even in the case of carrying out no surface activation treatments.

In accordance with the ink binder and ink composition, a film exhibiting superior adhesive properties with silicones can be easily formed even in the case of carrying out no surface activation treatments.

The molded bodies of the present invention exhibit superior adhesive properties with members containing silicones even in the case of carrying out no surface activation treatments. In addition, the molded bodies of the present invention exhibit superior properties such as abrasion resistance, mechanical properties such as tensile rupture strength, tensile fracture elongation and the like, flexibility, oil resistance, elasticity recovery properties, water resistance, water repellency, thermal resistance, cold resistance, mold release properties, electrical insulation properties, and the like, have reduced residual strain, and exhibit appropriate softness.

The composite molded bodies of the present invention exhibit superior adhesive properties with members containing polyurethanes and members containing silicones. In addition, the aforementioned composite molded bodies of the present invention exhibit superior properties such as abrasion resistance, mechanical properties such as tensile rupture strength, tensile fracture elongation and the like, flexibility, oil resistance, elasticity recovery properties, water resistance, water repellency, thermal resistance, cold resistance, mold release properties, electrical insulation properties, and the like, have reduced residual strain, and exhibit appropriate softness.

In accordance with the process for manufacturing a composite molded body of the present invention, the aforementioned composite molded body can be easily manufactured.

BEST MODES FOR CARRYING OUT THE INVENTION

Hereinafter, the present invention is described in detail.
<Polyurethane and Manufacturing Process Thereof>
First Mode for Carrying out the Present Invention
Polyurethane A polyol unit of the aforementioned polyurethane contains an alkenyl group-containing organopolysiloxane structure in an amount ranging from 0.01 to 20% by weight with respect to the weight of the polyurethane (namely, 100% by weight of the polyurethane). If the amount of the alkenyl group-containing organopolysiloxane structure in the polyurethane is below 0.01% by weight, adhesive properties with silicones may be reduced. On the other hand, if the amount of the alkenyl group-containing organopolysiloxane structure in the polyurethane exceeds 20% by weight, not only adhesive properties with silicones may be reduced, but also mechanical performance of the obtained polyurethane may also be reduced.

In addition, the content of the aforementioned alkenyl group-containing organopolysiloxane structure in the polyurethane preferably ranges from 0.03 to 1% by weight, more preferably ranges from 0.06 to 0.5% by weight, and in particular, preferably ranges from 0.08 to 0.4% by weight.

The molecular structure of the alkenyl group-containing organopolysiloxane structure is not particularly restricted, and as examples thereof, mention may be made of a linear structure, a branched structure, a linear structure with a partially branched structure and a dendrimer structure.

In addition, the polyurethane may have a single type of an alkenyl group-containing organopolysiloxane structure, or may have two or more types of alkenyl group-containing organopolysiloxane structures.

In the case where the polyol unit having alkenyl group-containing organopolysiloxane structure is a chain extender unit described below, the alkenyl group-containing organopolysiloxane structure preferably has a linear molecular structure or a partially branched molecular structure.

As examples of the aforementioned alkenyl group-containing organopolysiloxane structures, mention may be made of, for example, a structure having an alkenyl group bonding to a silicon atom (a silicon atom-bonding alkenyl group). As examples of silicon atom-bonding alkenyl groups, mention may be made of, for example, alkenyl groups having 2 to 10 carbon atoms such as a vinyl group, an allyl group, a butenyl group, a pentenyl group, a hexenyl group, a heptenyl group and the like. A vinyl group, an allyl group, and a hexenyl group are preferred.

In addition, the alkenyl group-containing organopolysiloxane structure may have a silicon atom-bonding group other than an alkenyl group. As examples of the silicon atom-bonding group other than an alkenyl group, mention may be made of, for example, alkyl groups such as a methyl group, an ethyl group, a propyl group, a butyl group, an octyl group and the like; cycloalkyl groups such as a cyclopentyl group, a cyclohexyl group and the like; aryl groups such as a phenyl group, a tolyl group, a xylyl group and the like; aralkyl groups such as a benzyl group, a phenylethyl group and the like; substituted or non-substituted monohydrocarbon groups such as halogenated alkyl groups such as such as a 3,3,3-trifluoropropyl group and the like, and in addition, a small amount of alkoxyl groups. Among these, a methyl group and a phenyl group are preferred.

The content of the alkenyl group in the alkenyl group-containing organopolysiloxane structure is preferably in the range of 1 to 56% by weight. If the content of the alkenyl group is 1% by weight or more, adhesive properties of the obtained polyurethane with silicones are further improved, and if the content is 56% by weight or less, superior commercially availability of raw materials can be exhibited.

As detailed examples of the alkenyl group-containing organopolysiloxane structures, mention may be made of structures corresponding to alkenyl group-containing diorganopolysiloxanes such as a polymethylvinylsiloxane, a polymethylallylsiloxane, a polymethylhexenylsiloxane, a copolymer of dimethylsiloxane and methylvinylsiloxane, a copolymer of dimethylsiloxane and methylallylsiloxane, a copolymer of dimethylsiloxane and methylhexenylsiloxane, a copolymer of methylphenylsiloxane and methylvinylsiloxane, a copolymer of methylphenylsiloxane and methylallylsiloxane, a copolymer of methylphenylsiloxane and methylhexenylsiloxane, a copolymer of diphenylsiloxane and methylvinylsiloxane, a copolymer of diphenylsiloxane and phenylvinylsiloxane copolymer, a methyl(3,3,3-trifluoropropyl) siloxane/methylvinylsiloxane copolymer and the like; organosiloxane copolymers consisting of siloxane units represented by the following formula: $(CH_3)_3SiO_{1/2}$, siloxane units represented by the following formula: $(CH_3)_2(CH_2=CH)SiO_{1/2}$, siloxane units represented by the following formula: $CH_3SiO_{3/2}$, and siloxane units represented by the following formula: $(CH_3)_2SiO_{2/2}$, and the like. Among these, the structures corresponding to alkenyl group-containing diorganopolysiloxanes are preferred since polyurethanes exhibiting superior physical properties such as non-stickiness, melt-molding properties, melt-adhesive properties and the like, and having uniform silicone adhesive properties can be effectively obtained.

The aforementioned alkenyl group-containing organopolysiloxane structure can be derived from an alkenyl group-containing organopolysiloxane polyol (a polyol having an alkenyl group-containing organopolysiloxane structure).

The aforementioned alkenyl group-containing organopolysiloxane polyol can be used as a polymer polyol at the time of manufacturing a polyurethane, and can also be used as a chain extender.

In the case of using the alkenyl group-containing organopolysiloxane polyol as a polymer polyol, an alkenyl group-containing organopolysiloxane polyol preferably has the number average molecular weight ranging from 600 to 100,000.

A polyurethane in which the alkenyl group-containing organopolysiloxane polyol preferably has the aforementioned number average molecular weight is used as a polymer polyol exhibits non-stickiness, superior mechanical strength and superior thermal resistance.

In the case of using the alkenyl group-containing organopolysiloxane polyol as a chain extender, the alkenyl group-containing organopolysiloxane polyol preferably has the number average molecular weight ranging from 100 to 600, and more preferably has the number average molecular weight ranging from 100 to 450. A polyurethane in which the alkenyl group-containing organopolysiloxane polyol preferably having the aforementioned number average molecular weight is used as a chain extender exhibits superior softness.

The number average molecular weight of the alkenyl group-containing organopolysiloxane polyol in the specification of the present application corresponds to a number average molecular weight calculated on the basis of polystyrene standard measured by gel permeation chromatography (GPC).

The number of the hydroxyl group which the aforementioned alkenyl group-containing organopolysiloxane polyol has is preferably 1 or more, and is more preferably 1.2 or more, further preferably ranges from 1.4 to 3, and in particular, preferably is substantially 2, per molecule of the aforementioned alkenyl group-containing organopolysiloxane polyol. The hydroxyl group which the alkenyl group-containing organopolysiloxane polyol has is preferably a silicon atom-bonding hydroxyl group, or a hydroxyl group of a silicon atom-bonding carbinol group (a hydroxyl group bonding to a silicon atom via an alkylene group having 2 to 20 carbon atoms, and the like) since a polyurethane-forming reaction can be carried out, more uniformly at the time of manufacturing a polyurethane. The aforementioned hydroxyl groups may be present at the side chain of the molecular chain or may be present at the terminal of the molecular chain.

The aforementioned alkenyl group-containing organopolysiloxane polyol is preferably an alkenyl group-containing diorganopolysiloxane of which both terminals of a molecular chain are capped with hydroxyl groups which has silicon atom-bonding hydroxyl groups or silicon atom-bonding carbinol groups at both terminals of the molecular chain. In the specification of the present application, "a structure of an alkenyl group-containing diorganopolysiloxane of which both terminals of a molecular chain are capped with hydroxyl groups" means a polysiloxane in which both terminals of the alkenyl group-containing diorganopolysiloxane are capped with hydroxyl groups. The reasons why the alkenyl group-containing diorganopolysiloxane of which both terminals of a molecular chain are capped with hydroxyl groups is preferred are described below. If the aforementioned alkenyl group-containing organopolysiloxane polyol is used, at the time of manufacturing a polyurethane, the hydroxyl groups at both terminals of the molecular chain can be involved in extension of the main chain. As a result, the alkenyl group-containing organopolysiloxane structure can be effectively introduced in the polyurethane, and at the same time, the polyurethane exhibiting superior physical properties such as non-stickiness, melt-molding properties, melt-adhesive properties and the like, and having uniform silicone adhesive properties can be reliably obtained.

As examples of the aforementioned alkenyl group-containing organopolysiloxane of which both terminals of a molecular chain are capped with hydroxyl groups, mention may be made of a polymethylvinylsiloxane of which both terminals of a molecular chain are capped with hydroxyl groups, a copolymer of methylvinylsiloxane and dimethylsiloxane of which both terminals of a molecular chain are capped with hydroxyl groups, a copolymer of methylallylsiloxane and dimethylsiloxane of which both terminals of a molecular chain are capped with hydroxyl groups, a copolymer of methylhexenylsiloxane and dimethylsiloxane of which both terminals of a molecular chain are capped with hydroxyl groups, a copolymer of methylvinylsiloxane and methylphenylsiloxane of which both terminals of a molecular chain are capped with hydroxyl groups, a copolymer of methylallylsiloxane and methylphenylsiloxane of which both terminals of a molecular chain are capped with hydroxyl groups, a copolymer of methylhexenylsiloxane and methylphenylsiloxane of which both terminals of a molecular chain are capped with hydroxyl groups, a copolymer of methylvinylsiloxane and diphenylsiloxane of which both terminals of a molecular chain are capped with hydroxyl groups, a copolymer of phenylvinylsiloxane and diphenylsiloxane of which both terminals of a molecular chain are capped with hydroxyl groups, and a copolymer of methylvinylsiloxane and methyl(3,3,3-trifluoropropyl)siloxane. The aforementioned organopolysiloxanes of which both terminals of a molecular chain are capped with hydroxyl groups may be used as a single type or in combination of two or more types thereof.

As examples of processes for manufacturing the aforementioned alkenyl group-containing organopblysiloxanes of which both terminals of a molecular chain are capped with hydroxyl groups, mention may be made of, for example, a process in which an alkenyl group-containing diorganodichlorosilane such as alkylalkenyldichiorosilane, a mixture of dialkyldichiorosilane and alkylalkenyldichiorosilane, or the like is hydrolyzed; a process in which an alkenyl group-containing linear diorganopolysiloxane having chlorine atoms at both terminals is hydrolyzed; a process in which an alkenyl group-containing cyclodiorganopolysiloxane such as cycloalkylalkenylpolysiloxane, a mixture of cyclodialkylpolysiloxane and cycloalkylalkenylpolysiloxane, or the like is equilibrated in the presence of water; a process in which an alkenyl group-containing diorganodialkoxysilane such as alkylalkenyldialkoxysilane, a mixture of dialkyldialkoxysilane and alkylalkenyldialkoxysilane, or the like is hydrolyzed; and the like.

The aforementioned polyurethane can comprise polyol units derived from polymer polyols other than the aforementioned alkenyl group-containing organopolysiloxane polyol, as long as the polyurethane comprises the alkenyl group-containing organopolysiloxane structure in the aforementioned amount.

As the other polymer polyols, various polymer polyols commonly used in manufacturing a polyurethane can be used. As examples of the other polymer polyols, mention may be made of a polyester polyol, a polyether polyol, a polycarbonate polyol, a polyester polycarbonate polyol, a polyolefin-based polyol, a castor oil-based polyol, a silicone-based polyol other than the aforementioned alkenyl group-containing organopolysiloxane polyols, and the like. The aforementioned polyols may be used as a single type alone, or alternatively, may be used in combination with two or more types thereof. Among these, one type or two or more types of polyester polyols, polyether polyols, polycarbonate polyols may be preferably used, and polyester polyols and/or polyether polyols may be more preferably used.

The aforementioned polyester polyol can be obtained in accordance with conventional processes, for example, by a process in which a polyol component and a polycarboxylic acid component such as an ester-formable derivative such as a polycarboxylic acid, an ester thereof, an anhydride thereof are directly subjected to an esterification reaction or an ester exchange reaction, or a process in which a lactone is subjected to a ring-opening polymerization using a polyol as an initiator.

As the polyol component which can be used in manufacturing the polyester polyol, a polyol commonly used in manufacturing a polyester can be used. As examples thereof, mention may be made of, for example, dials having two hydroxyl groups per molecule such as aliphatic diols having 2 to 15 carbon atoms such as ethylene glycol, diethylene glycol, triethylene glycol, propylene glycol, 1,3-propanediol, 2-methyl-1,3-propanediol, 2,2-diethyl-1,3-propanediol, 1,3-butanediol, 1,4-butanediol, 2-methyl-1,4-butanediol, neopentyl glycol, 1,5-pentanediol, 3-methyl-1,5-pentanediol, 1,6-hexanediol, 1,7-heptanediol, 1,8-octanediol, 2-methyl-1,8-octanediol, 2,7-dimethyl-1,8-octanediol, 1,9-nonanediol, 2-methyl-1,9-nonanediol, 2,8-dimethyl-1,9-nonanediol, 1,10-decanediol and the like; alicyclic dials such as 1,4-cyclohexanediol, cyclahexanedimethanol, cyclooctanedimethanol, dimethylcyclooctanedimethanol, and the like; aromatic divalent alcohols such as 1,4-bis(beta-hydroxyethoxy)benzene, and the like, polyols having 3 or more hydroxyl groups per molecule such as trimethylolpropane, trimethylolethane, glycerol, 1,2,6-hexanetriol, pentaerythritol, diglycerol and the like, and the like. The aforementioned polyols may be used as a single type or in combination with two or more types thereof.

In addition, in the case of obtaining a molded body from a polyurethane, as the aforementioned polyol component, a linear aliphatic diol having 4 to 10 carbon atoms such as 1,4-butanediol, 1,6-hexanediol, 1,8-octanediol or the like is preferably used.

On the other hand, as the polycarboxylic acid component used in manufacturing the polyester polyol, a polycarboxylic acid component which is commonly used in manufacturing a polyester can be used. As examples thereof, mention may be made of aliphatic dicarboxylic acids having 4 to 12 carbon atoms such as succinic acid, glutaric acid, adipic acid, pimelic acid, suberic acid, azelaic acid, sebacic acid, dodecanedioic acid, methylsuccinic acid, 2-methylglutaric acid, 3-methylglutaric acid, trimethyladipic acid, 2-methyloctanedioic acid, 3,8-dimethyldecanedioic acid, 3,7-dimethyldecanedioic acid and the like; alicyclic dicarboxylic acids such as cyclohexanedicarboxylic acid, dimmer acid, hydrogenated dimmer acid and the like; aromatic dicarboxylic acids such as terephthalic acid, isophthalic acid, orthophthalic acid, naphthalene dicarboxylic acid and the like; polycarboxylic acids having 3 or more functions such as trimellitic acid, pyromellitic acid and the like; ester-formable derivatives thereof, and the like. The aforementioned polycarboxylic acid components may be used as a single type alone, or in combination with two or more types thereof.

Among these, aliphatic dicarboxylic acids having 6 to 12 carbon atoms, and in particular, one type or two or more types of adipic acid, azelaic acid, and sebacic acid are preferably used.

In addition, as examples of a lactone which can be used in manufacturing a polyester polyol, mention may be made of ε-caprolactone, beta-methyl-delta-valerolactone and the like.

As examples of the aforementioned polyether polyols, mention may be made of, for example, polyethylene glycol, polypropylene glycol, polytetramethylene glycol, poly(methyltetramethylene glycol) and the like, which can be obtained by subjecting a cyclic ether to a ring-opening polymerization in the presence of a polyol. The polyether polyols may be used as a single type alone, or in combination with two or more types thereof.

Among these, polytetramethylene glycol and/or poly(m-ethyltetramethylene glycol) may be preferably used.

As examples of the aforementioned polycarbonate polyols, mention may be made of, for example, those obtained by reacting a polyol with a carbonate compound such as dialkyl carbonate, alkylene carbonate, diallyl carbonate or the like.

As the polyol constituting the polycarbonate polyol, the same one as the polyol used at the time of obtaining a polyester polyol can be used.

As examples of dialkyl carbonates, mention may be made of dimethyl carbonate, diethyl carbonate and the like. As examples of alkylene carbonates, mention may be made of ethylene carbonate and the like. As examples of diaryl carbonates, mention may be made of diphenyl carbonate and the like.

As examples of the aforementioned polyester polycarbonate polyols, mention may be made of, for example, one obtained by reacting a polyol, a polycarboxylic acid component and a carbonate compound at the same time, or one obtained by independently synthesizing a polyester polyol and a polycarbonate polyol beforehand in accordance with the aforementioned process, followed by reacting with a carbonate compound, or reacting with a polyol and a polycarboxylic acid component, and the like.

The number average molecular weight of the polymer polyols other than the aforementioned alkenyl group-containing organopolysiloxane polyol preferably ranges from 500 to 8,000, more preferably ranges from 600 to 5,000, and further preferably ranges from 800 to 5,000. When the polymer polyols (other polymer polyols) having the number average molecular weight within the aforementioned range are used, polyurethanes exhibiting superior mechanical properties such as non-stickiness, melt-molding properties, melt-adhesive properties, abrasion resistance, tensile rupture strength and the like, and exhibiting superior softness, superior flexibility, and reduced residual strain, can be obtained.

The number average molecular weight of the other polymer polyol used in the specification of the present application is the number average molecular weight obtained on the basis of the hydroxyl group value measured in accordance with JIS K-1557.

The number of the hydroxyl group which the aforementioned other polymer polyol has is preferably one or more on average per molecule of the other polymer polyol, more preferably 1.2 or more, further preferably ranges from 1.4 to 3, and in particular, is substantially 2 (that is, the polymer polyol is a polymer diol).

As the organic polyisocyanate for obtaining the organic polyisocyanate unit which the aforementioned polyurethane has, an organic polyisocyanate commonly used in the manufacture of a polyurethane can be used. As examples thereof, mention may be made of, for example, aromatic diisocyanates such as 4,4'-diphenylmethane diisocyanate, tolylene diisocyanate, phenylene diisocyanate, xylylene diisocyanate, 1,5-naphthylene diisocyanate, 3,3'-dichloro-4,4'-diphenylmethane diisocyanate and the like; aliphatic or alicyclic diisocyanates such as hexamethylene diisocyanate, isophorone diisocyanate, 4,4'-dicyclohexylmethane diisocyanate, hydrogenated xylylene diisocyanate and the like; and the like. The organic polyisocyanate(s) may be used as a single type alone, or in combination with two or more types thereof.

Among these, 4,4'-diphenylmethane diisocyanate is preferred.

The aforementioned polyurethane may have a chain extender unit. As the chain extender for obtaining the chain extender unit, a low molecule compound with a molecular weight of 450 or less having two or more active hydrogen atoms, which is commonly used in the manufacture of a polyurethane, can be used.

As examples of the chain extender, mention may be made of, for example, diols such as ethylene glycol, propylene glycol, 1,4-butanediol, 1,6-hexanediol, 1,4-bis(beta-hydroxyethoxy) benzene, 1,4-cyclohexanediol, bis(beta-hydroxyethyl) terephthalate, xylylene glycol and the like; diamines such as hydrazine, ethylenediamine, propylenediamine, xylylenediamine, isophorone diamine, piperazine or derivatives thereof, phenylenediamine, tolylenediamine, xylenediamine, adipic dihydrazide, isophthalic dihydrazide, and the like; aminoalcohols such as aminoethyl alcohol, aminopropyl alcohol, and the like; and the like. The aforementioned chain extender(s) may be used as a single type alone or in combination with two or more types thereof. Among these, an aliphatic diol having 2 to 10 carbon atoms is preferable, and 1,4-butanediol is more preferable. In the case of using a polyol such as a diol or the like as the chain extender, the chain extender unit is contained in the polyol unit.

The aforementioned polyurethane may contain optional components such as various additives such as a mold release agent, a strengthening agent, a coloring agent, a flame retardant, a UV absorber, an antioxidant, an improver of anti-hydrolysis properties, a fungicide, an antibacterial agent, a stabilizer and the like; various fibers such as glass fibers, polyester fibers and the like; inorganic materials such as talc, silica and the like; various coupling agents and the like, within a range which does not impair the effects of the present invention, if necessary.

In the aforementioned polyurethane, the content of nitrogen atoms therein preferably ranges from 1 to 6% by weight, more preferably ranges from 1.5 to 5% by weight, and further preferably ranges from 2 to 4.5% by weight, with respect to 100% by weight of the polyurethane. The polyurethane having the nitrogen atom content within the aforementioned range exhibits superior adhesive properties with a silicone. A molded body obtained from the aforementioned polyurethane is more superior in abrasion resistance, mechanical properties, flexibility, oil resistance, elasticity recovery properties, water resistance, water repellency, thermal resistance, cold resistance, mold releasing properties, and electrical insulation properties.

The logarithmic viscosity of the aforementioned polyurethane preferably ranges from 0.5 to 1.5 dl/g, more preferably ranges from 0.6 to 1.4 dl/g, and furthermore preferably ranges form 0.7 to 1.3 dl/g.

The polyurethane having the logarithmic viscosity within the aforementioned range exhibits superior adhesive properties with a silicone. In addition, a molded body obtained from the aforementioned polyurethane is more superior in abrasion resistance, mechanical properties, flexibility, oil resistance, elasticity recovery properties, water resistance, water repellency, thermal resistance, cold resistance, mold releasing properties, and electrical insulation properties.

The logarithmic viscosity ($\eta_{inh}$) of the aforementioned polyurethane is the value measured in accordance with the following method.

A polyurethane is dissolved in DMF (dimethylformamide) so that the concentration of the polyurethane is 0.5 g/dl, and the time of flow of the obtained polyurethane solution at 30° C. was measured by means of an Ubbelohde viscosimeter. The logarithmic viscosity ($\eta_{inh}$) of the polyurethane was calculated in accordance with the following equation.

$$\text{Logarithmic viscosity of polyurethane } (\eta_{inh}) = [\ln(t/t_0)]/c$$

wherein t represents a time (seconds) of flow of a polyurethane solution; $t_0$ represents a time (seconds) of flow of a solvent (DMF); and c represents a concentration (g/dl) of a polyurethane solution.

Manufacturing Method for Polyurethane

A manufacturing method for a polyurethane in accordance with the first mode for carrying out the present invention is a method in which a polymer polyol, an organic polyisocyanate, and an optional chain extender, if necessary, are reacted, in which as at least one part of the chain extender or the polymer polyol, an alkenyl group-containing diorganopolysiloxane of which both terminals of a molecular chain are capped with hydroxyl groups is used.

As examples of the urethane-forming reaction, mention may be made of a method in which a polymer polyol, an organic polyisocyanate, and an optional chain extender, if necessary, are reacted (one-step method), and a method in which a prepolymer obtained by reacting a polymer polyol and an organic polyisocyanate is reacted with a chain extender (two-step method).

In addition, a melt-polymerization is preferably carried out substantially in the absence of a solvent. In view of productivity, in particular, a continuous melt-polymerization method by means of a multiaxis screw-type extruder is more preferably used. At that time, the melting temperature preferably ranges from 180 to 280° C.

In the aforementioned manufacturing method for a polyurethane, the aforementioned alkenyl group-containing diorganopolysiloxane of which both terminals of a molecular chain are capped with hydroxyl groups is used in an amount ranging from 0.01 to 20% by weight with respect to the weight of the obtained polyurethane.

If the usage amount of the alkenyl group-containing diorganopolysiloxane of which both terminals of a molecular chain are capped with hydroxyl groups is below 0.01% by weight, adhesive properties with silicones may be reduced. On the other hand, if the usage amount thereof exceeds 20% by weight, not only adhesive properties with silicones are reduced, but also mechanical performance of the obtained polyurethane is also reduced.

In addition, the usage amount of the alkenyl group-containing diorganopolysiloxane of which both terminals of a molecular chain are capped with hydroxyl groups preferably ranges from 0.03 to 1% by weight, more preferably ranges from 0.06 to 0.5% by weight, and in particular, preferably ranges from 0.08 to 0.4% by weight, with respect to the weight of the obtained polyurethane.

The ratio of each of the components at the time of manufacturing a polyurethane is appropriately determined considering hardness, mechanical performance and the like to be imparted for the objective polyurethane. A molar ratio of (the active hydrogen atom):(isocyanate group), present in the reaction system, preferably ranges from 1:0.9 to 1:1.3, and more preferably ranges from 1:0.9 to 1:1.1. With the aforementioned ratio, a polyurethane exhibiting superior abrasion resistance, mechanical properties, water resistance, flexibility, oil resistance, and elasticity recovery properties can be obtained.

The aforementioned reaction is preferably carried out in the presence of at least one catalyst for a urethane-forming reaction selected from organic zinc-based compounds, organic bismuth-based compounds, organic titanium-based compounds and organic zirconium-based compounds, since the reaction period can be reduced. Among the urethane-forming reaction catalysts, one or more types of organic titanium-based compounds and organic zirconium-based compounds are preferably used, and organic titanium-based compounds are more preferred.

An organic tin-based compound widely used in the manufacture of a polyurethane is not preferable since, at the time of manufacturing a composite molded body having a member containing a silicone described below, the organic tin-based compound acts on the platinum which is a curing catalyst for a silicone and a curing function of the platinum catalyst may be reduced.

As examples of the aforementioned organic zinc-based compounds, mention may be made of, for example, zinc acetyl acetonate, zinc propionate, zinc octanoate, zinc 2-ethylhexanoate, zinc neodecanoate, zinc laurate, zinc stearate, zinc linoleate, zinc naphthenate, zinc benzoate, zinc salicylate, and the like.

As examples of organic bismuth-based compounds, mention may be made of, for example, bis(acetylacetone) bismuth, bismuth 2-ethylhexanoate, bismuth neodecanoate, bismuth salicylate and the like.

As examples of organic titanium-based compounds, mention may be made of, for example, tetraalkoxy titanium compounds such as tetraisopropyl titanate, tetra-n-butyl titanate, tetra-2-ethylhexyl titanate, tetrastearyl titanate and the like; titanium acylate compounds such as polyhydroxytitanium stearate and the like; titanium chelate compounds such as titanium acetyl acetate, triethanolamine titanate, titanium ammonium lactate, titanium ethyl lactate, titanium octylene glycol and the like; and the like.

As examples of organic zirconium-based compounds, mention may be made of, for example, zirconium tetraisopropoxide, zirconium tetra-n-butoxide, zirconium tetra-t-butoxide, zirconium 2-ethylhexanoate, zirconium neodecanoate, zirconium acetyl acetonate, and the like.

The usage amount of the aforementioned catalyst for a urethane-forming reaction preferably ranges from 0.1 ppm to 0.2% by weight, more preferably ranges from 0.5 ppm to 0.02% by weight, and further preferably ranges from 1 ppm to 0.01% by weight, with respect to the weight of the obtained polyurethane. If the usage amount of the catalyst for a urethane-forming reaction is 0.1 ppm or more, a polyurethane exhibiting superior melt-molding properties and superior adhesive properties with silicones can be obtained. In addition, if the usage amount is 0.2% by weight or less, the melt-molding properties (in particular, melt-retention stability) of the obtained polyurethane can be enhanced.

Second Mode for Carrying out the Present Invention
Polyurethane

The polyurethane in the second mode for carrying out the present invention is a block copolymer (I/II) having a polyurethane block (I) and an addition polymerization-type block (II), and namely, a block copolymer-type polyurethane.

The aforementioned polyurethane block (I) is the same as the polyurethane in the first mode for carrying out the present invention. In addition, the addition polymerization-type block (II) is a product derived from a block copolymer having a polymer block (A) containing an aromatic vinyl compound unit and a polymer block (B) containing a conjugated diene unit or a hydrogen additive of the aforementioned block copolymer.

The aforementioned polyurethane is preferably used in the case of blending in a non-polar thermoplastic polymer, since a thermoplastic polymer composition for molding which provides more superior adhesive properties with silicones can be obtained.

The bonding form between the polyurethane block (I) and the addition polymerization-type block (II) in the aforementioned block copolymer (I/II) is not particularly restricted, and any bonding form of a linear form, a branched chain form, a radiation form, and a combination form thereof may be used. A linear bonding form is preferred.

The structure of the block copolymer (I/II) may be represented by various forms such as formulae: α-β, α-β-α, β-α-β, and the like, wherein the aforementioned polyurethane block (I) is represented by "α", and the aforementioned addition polymerization-type block (II) is represented by "β". A di-block type structure of α-β type is preferred. When the di-block type of block copolymer (I/II) is used, a thermoplastic polymer composition for molding exhibiting more superior adhesive properties with silicones can be obtained at the time of blending the block copolymer in a non-polar thermoplastic polymer.

In the case of the block copolymer (I/II) containing two or more polyurethane blocks (I), the polyurethane blocks (I) may be the same copolymer blocks as one another, and may be different copolymer blocks.

In the case of the block copolymer (I/II) containing two or more addition polymerization-type blocks (II), each of the addition polymerization-type blocks (II) may be the same copolymer blocks as one another, and may be different copolymer blocks.

For example, in two "α"s (polyurethane blocks (I)) in the tri-block structure represented by the aforementioned α-β-α, or two "β"s (addition polymerization-type blocks (II)) in the tri-block structure represented by the aforementioned β-α-β, types, bonding forms, number average molecular weights and the like of the structural units forming them may be the same or may be different.

The weight ratio of the aforementioned polyurethane block (I) and addition polymerization-type block (II) (polyurethane block (I)/addition polymerization-type block (II)) in the aforementioned block copolymer (I/II) preferably ranges from 90/10 to 5/95, more preferably ranges from 90/10 to 10/90, furthermore preferably ranges from 80/20 to 20/80, and in particular, preferably ranges from 70/30 to 30/70. If the weight ratio of the aforementioned polyurethane block (I) and addition polymerization-type block (II) is within the aforementioned range, a thermoplastic polymer composition for molding exhibiting more superior adhesive properties with silicones can be obtained at the time of blending in a non-polar thermoplastic polymer.

Even in the aforementioned block copolymer (I/II), the amount of the alkenyl group-containing organopolysiloxane structure ranges from 0.01 to 20% by weight, preferably ranges from 0.03 to 1% by weight, more preferably ranges from 0.06 to 0.5% by weight, and in particular, preferably ranges from 0.08 to 0.4% by weight, with respect to the weight of the polyurethane, for the same reasons as those described in the first mode for carrying out the present invention.

As examples of aromatic vinyl compound units of the polymer block (A) which the addition polymerization-type block (II) has in the aforementioned block copolymer (I/II), mention may be made of, for example, units derived from aromatic vinyl compounds such as styrene, α-methylstyrene, β-methylstyrene, o-methylstyrene, m-methylstyrene, p-methylstyrene, 2,4-dimethylstyrene, 2,4,6-trimethylstyrene, 4-propylstyrene, t-butylstyrene, 4-cyclohexylstyrene, 4-dodecylstyrene, 2-ethyl-4-benzylstyrene, 4-(phenylbutyl) styrene, 1-vinylnaphthalene, vinylanthracene, indene, acetonaphthylene, monofluorostyrene, difluorostyrene, monochlorostyrene, methoxystyrene and the like. The aforementioned aromatic vinyl compounds may be used as a single type alone or in combination with two or more types thereof.

Among the aforementioned aromatic vinyl compounds, main use of styrene and/or α-methylstyrene is preferred.

The aforementioned polymer block (A) may contain a small amount of other copolymerizable monomer units, in addition to the aromatic vinyl compound units, if necessary. The amount of the other copolymerizable monomer units is preferably 30% by weight or less, and more preferably 10% by weight or less, with respect to the weight of the polymer block (A).

As examples of the other copolymerizable monomer units, mention may be made of, for example, 1-butene, pentene, hexene, butadiene, 2-methyl-1,3-butadiene (isoprene), methyl vinyl ether and the like.

As examples of conjugated diene units of the polymer block (B) which the addition polymerization-type block (II) has, mention may be made of units derived from conjugated dienes such as 1,3-butadiene, 2-methyl-1,3-butadiene (isoprene), 2,3-dimethyl-1,3-butadiene, 1,3-pentadiene, 1,3-hexadiene, and the like. The aforementioned conjugated dienes may be used as a single type alone, or in combination with two or more types thereof. In the case of the polymer block (B) containing structural units derived from two or more types of conjugated dienes, the bonding form thereof may be random type, a taper type, or a partial block type, or the aforementioned types may be combined. The amount of the conjugated diene units is preferably 70% by weight or more, and more preferably 90% by weight, with respect to the weight of the polymer block (B).

The aforementioned addition polymerization-type block (II) may be derived from a hydrogen additive of the block copolymer having the aforementioned polymer block (A) and polymer block (B). In this case, a part or all parts of the unsaturated double bonds which the polymer block (B) has is/are usually hydrogenated.

The hydrogen addition index of the polymer block (B) is preferably 50% by mole or more, more preferably 60% by mole or more, and further preferably 80% by mole or more in the case of setting the total moles of the unsaturated double bonds which the polymer block (B) before the hydrogenation has to 100% by mole, in view of thermal resistance, weather resistance, and light resistance.

In the addition polymerization-type block (II), the conjugated diene unit contained in the polymer block (B) is preferably an isoprene unit, a butadiene unit, or a mixture of an isoprene unit and a butadiene unit. Namely, the polymer block (B) is preferably an isoprene polymer block, a butadiene polymer block or an isoprene-butadiene copolymer block. With the aforementioned polymer block (B), melt-molding properties of the thermoplastic polymer composition for molding described below can be improved.

In addition, a copolymer block (B') in which the polymer block (B) which is any one of an isoprene polymer block, a butadiene polymer block, and an isoprene-butadiene copolymer block is hydrogenated is also preferred. In this case, melt-molding properties of the thermoplastic polymer composition for molding described below can be further improved.

When the conjugated diene unit contained in the polymer block (B) of the addition polymerization-type block (II) is an isoprene unit or a combination of an isoprene unit and a butadiene unit (namely, when the polymer block (B) is an isoprene polymer block or an isoprene-butadiene copolymer block), the ratio of the total of the butadiene unit and isoprene unit of the 1,2-bond and 3,4-bond contained in the polymer block (B) is preferably 30% by mole or more, and more preferably 40% by mole or more, in the case of setting the total of the butadiene units and isoprene units of 1,4-bond, 1,2-bond and 3,4-bond to 100% by mole.

If the ratio of the total of the butadiene unit and isoprene unit of the 1,2-bond and 3,4-bond is 30% by mole or more, the block copolymer (I/II) exhibiting superior vibration suppression performance and superior melt-molding properties in which the value of a loss coefficient is increased at around room temperature, and a large loss coefficient value can be maintained over a wide temperature range can be obtained. In addition, even in the case of hydrogenating the aforementioned polymer block (B), the same effects can be obtained.

In addition, when conjugated diene unit contained in the polymer block (B) of the addition polymerization-type block (II) is a butadiene unit (namely, when the polymer block (B) is a butadiene copolymer block), the ratio of the butadiene unit of the 1,2-bond is preferably 60% by mole or more, and more preferably 80% by mole or more in the case of setting the total of the butadiene units of the 1,4-bond and 1,2-bond to 100% by mole.

If the ratio of the butadiene unit of the 1,2-bond is 60% by mole or more, the block copolymer (I/II) exhibiting superior vibration suppression performance and superior melt-molding properties in which the value of a loss coefficient is increased at around room temperature, and a large loss coefficient value can be maintained over a wide temperature range can be obtained. In addition, even in the case of hydrogenating the aforementioned polymer block (B), the same effects can be obtained.

The bonding form between the polymer block (A) and the polymer block (B) or the polymer block (B') in which the polymer block (B) is hydrogenated is not particularly restricted, and may be any one of a linear form, a branched chain form, a radiation form and a combination form thereof. A linear bonding form is preferred.

As examples of the structure of the addition polymerization-type block (II), mention may be made of $(A-B)_m-A$, $(A-B)_n$, or $B-(A-B)_p$, wherein m, n and p independently represent an integer of 1 or more, in the case of indicating the polymer block (A) as "A", indicating the polymer block (B) or hydrogenated copolymer thereof as "B", or the like.

Among these, a structure in which two or more "A"s and one or more "B"s bond in the linear form is preferred, and a tri-block structure represented by the following formula: A-B-A is more preferred. With the tri-block structure, the thermoplastic polymer composition for molding exhibiting more superior adhesive properties with silicones can be reliably obtained.

In the case of the addition polymerization-type block (II) containing two or more "A"s, the same copolymer blocks as each other may be used or different copolymer blocks may be used. In addition, in the case of the addition polymerization-type block (II) containing two or more "B"s, the same copolymer blocks as each other may be used or different copolymer blocks may be used. For example, in the two "A"s in the tri-block structure represented by A-B-A and the two "B"s in the tri-block structure represented by B-A-B, the types of aromatic vinyl compounds or conjugated dienes forming them, bonding forms thereof, number average molecular weight of the copolymer block may be the same or different.

The amount of the aromatic vinyl compound unit in the addition polymerization-type block (II) preferably ranges from 5 to 90% by weight and more preferably ranges from 10 to 90% by weight with respect to 100% by weight of the total weight of the addition polymerization-type block (II). When the block copolymer (I/II) having the addition polymerization-type block (II) in which the amount of the aromatic vinyl compound unit is within the aforementioned range is blended in a non-polar thermoplastic polymer, a thermoplastic polymer composition for molding having more superior adhesive properties with silicones can be reliably obtained.

In the case of obtaining a thermoplastic polymer composition for molding having more superior adhesive properties with silicones by blending the block copolymer (I/II) in an olefin-based polymer, the amount of the aromatic vinyl compound unit in the addition polymerization-type block (II) preferably ranges from 5 to 60% by weight and more preferably ranges from 10 to 50% by weight.

In the case of obtaining a thermoplastic polymer composition for molding having more superior adhesive properties with silicones by blending the block copolymer (I/II) in a styrene-based polymer, the amount of the aromatic vinyl compound unit in the addition polymerization-type block (II) preferably ranges from 40 to 90% by weight and more preferably ranges from 50 to 90% by weight.

The number average molecular weight of the polymer block (A) and polymer block (B) in the addition polymerization-type block (II) is not particularly restricted. Under the condition before hydrogenation, the number average molecular weight of the polymer block (A) preferably ranges from 2,500 to 75,000, and the number average molecular weight of the polymer block (B) preferably ranges from 10,000 to 150,000. When the block copolymer (I/II) having the addition polymerization-type block (II) formed from the polymer block (A) and polymer block (B) of which the number average molecular weight is within the aforementioned range is blended in a non-polar thermoplastic polymer, a thermoplastic polymer composition for molding having more superior adhesive properties with silicones can be reliably obtained.

In addition, the number average molecular weight of the whole addition polymerization-type block (II) is preferably within the range of 10,000 to 300,000 and more preferably within the range of 20,000 to 100,000. When the block copolymer (I/II) having the addition polymerization-type block (II) with the aforementioned number average molecular weight is blended in a non-polar thermoplastic polymer, a thermoplastic polymer composition for molding having more superior adhesive properties with silicones can be reliably obtained.

Even in the polyurethane of the present mode for carrying out the present invention, for the same reasons as those in the first mode for carrying out the present invention, the alkenyl group-containing organopolysiloxane structure preferably contains 1 to 56% by weight of an alkenyl group. In addition, the nitrogen atom-containing index preferably ranges from 1 to 6% by weight.

Manufacturing Method for Polyurethane

The manufacturing method for a polyurethane (block copolymer (I/II)) of the second mode for carrying out the present invention is a method of (1) or (2) described below. (1) A method in which a polymer polyol, an organic polyisocyanate and an optional chain extender, if necessary, are reacted in the presence of a functional group-containing block copolymer (II') by means of a catalyst for a urethane-forming reaction (Manufacturing method 1). In this manufacturing method, the polyurethane block (I) is formed on the main chain of the functional group-containing block copolymer (II'), and thereby, a block copolymer (I/II) is manufactured. (2) A method in which a reactant containing a polyurethane obtained by reacting a polymer polyol, an organic polyisocyanate and an optional chain extender, if necessary, by means of a catalyst for a urethane-forming reaction is reacted with a functional group-containing block copolymer (II') (Manufacturing method 2).

In the method of the aforementioned (I) or (2), the functional group-containing block copolymer (II') is a block copolymer having the aforementioned polymer block (A) and polymer block (B) or a hydrogen additive of the aforementioned block copolymer, and has a functional group which can react with the polymer polyol and/or the organic polyisocyanate.

In the case of manufacturing the block copolymer (I/II) by means of the aforementioned manufacturing method 1, the ratio of the aforementioned functional group-containing block copolymer (II') to the aforementioned polymer polyol, organic polyisocyanate and chain extender (weight of a functional group-containing block copolymer (II')):(weight of a polymer polyol+weight of an organic polyisocyanate+weight of a chain extender) preferably ranges from 10:90 to 90:10, more preferably ranges from 20:80 to 80:20, and further preferably ranges from 30:70 to 70:30.

The reaction product in the aforementioned manufacturing method 2 may be a reaction mixture of the polymer polyol and the organic polyisocyanate and, as an optional component, the chain extender, or a treated product in which the aforementioned reaction mixture is subjected to an after-treatment in accordance with a conventional method. In addition, for a part of the reaction product, a commercially available polyurethane may be used.

In accordance with the usage amount of each component, the reaction efficiency, and reaction conditions, an unreacted polymer polyol, an unreacted organic polyisocyanate, and an unreacted chain extender may be contained in the aforementioned reaction product, in addition to the formed polyurethane. In this case, in addition to a reaction between the polyurethane and the functional group of the functional group-containing block copolymer (II'), a reaction of the unreacted polymer polyol, the unreacted organic polyisocyanate and the unreacted chain extender, and the functional group of the functional group-containing block copolymer (II') occurs.

In the case of manufacturing the block copolymer (I/II) in accordance with the aforementioned manufacturing method 2, the ratio of the functional group-containing block copolymer (II') and the reaction product of the polymer polyol, organic polyisocyanate, and chain extender (weight of the functional group-containing block copolymer (II')):(weight of the reaction product of the polymer polyol, organic polyisocyanate and chain extender) preferably ranges from 10:90 to 90:10, more preferably ranges from 20:80 to 80:20, and further preferably ranges from 30:70 to 70:30.

The reaction mixture (block copolymer mixture) obtained in accordance with the aforementioned manufacturing method 1 or 2 may contain an unreacted functional group-containing block copolymer (II'), an unreacted polymer polyol, an unreacted organic polyisocyanate and an unreacted chain extender, in addition to the block copolymer (I/II). The amount of the aforementioned unreacted reactants varies depending on the reaction conditions such as a ratio of the raw materials used in the reaction, a reaction temperature and the like.

In addition, the aforementioned block copolymer mixture may contain a polyurethane which did not react with the functional group-containing block copolymer (II'). In addition, the block copolymer mixture may contain a block copolymer which has the polymer block (A) and polymer block (B) and does not have the functional group, or the hydrogen additive thereof (polymer having the same structure as that of the addition polymerization-type block (II)).

In the case of containing an unreacted polyurethane, an unreacted functional group-containing block copolymer (II'), or a polymer having the same structure as that of the addition polymerization-type block (II), the block copolymer mixture may be used as it is for each application, but the aforementioned unreacted materials may be removed as described below.

Namely, the polyurethane which did not react with the functional group-containing block copolymer (II') can be removed by forming the block copolymer mixture into pellets, if necessary, and pulverizing the block copolymer mixture into an appropriate size, followed by treating the pulverized mixture with a good solvent for a polyurethane, such as dimethylformamide or the like.

The functional group-containing block copolymer (II') which did not react with the polyurethane and the polymer having the same structure as that of the addition polymerization-type block (II) can be removed by treating them with a good solvent for the functional group-containing block copolymer (II'), such as cyclohexane or the like.

After the aforementioned treatment with the solvent, the solid products are preferably recovered and dried.

As examples of the functional groups which the aforementioned functional group-containing block copolymer (II') has, mention may be made of functional groups which can react with the polymer polyol and/or the organic polyisocyanate.

As examples of the functional groups which can react with the polymer polyol, mention may be made of a carboxyl group, an acid anhydride group, a thiocarboxyl group, an isocyanate group and the like.

As examples of the functional groups which can react with the organic polyisocyanate, mention may be made of a hydroxyl group, an amino group, a mercapto group, a carboxyl group, an acid anhydride group, a thiocarboxyl group, an isocyanate group and the like. The functional group-containing block copolymer (II') may contain two or more types of the aforementioned functional groups.

As the functional group which the functional group-containing block copolymer (II') has, a functional group which can react with the organic polyisocyanate compound is preferred. In particular, a hydroxyl group is more preferable since a uniform polyurethane-forming reaction can be carried out at the time of manufacturing the block copolymer (I/II).

In addition, the functional group which the functional group-containing block copolymer (II') has is preferably positioned at the terminal of the aforementioned functional group-containing block copolymer (II'). When the functional group-containing block copolymer (II') having the aforementioned functional group at the terminal is used, the aforementioned functional group is involved in the main-chain elongation caused by the polyurethane-forming reaction at the time of manufacturing the block copolymer (I/II). When the block copolymer (I/II) obtained as described above is blended in a non-polar thermoplastic polymer, a thermoplastic polymer composition for molding exhibiting more superior adhesive properties with silicones can be reliably obtained.

The number of the functional groups which the functional group-containing block copolymer (II') has is preferably 0.6 or more and more preferably 0.7 or more, on average per molecule of the functional group-containing block copolymer (II').

The manufacturing method for the functional group-containing block copolymer (II') is not particularly restricted. For example, an ion polymerization method such as an anion polymerization method, a cation polymerization method or the like, a single site polymerization method, a radical polymerization method or the like can be used.

In the manufacturing method with the anion polymerization method, first, an aromatic vinyl compound and a conjugated diene are subjected to a sequential polymerization using an alkyl lithium compound or the like as a polymerization initiator in an inert organic solvent such as n-hexane, cyclohexane or the like.

Subsequently, when the desirable molecular structure and molecular weight are achieved, a compound having an oxirane skeleton such as ethylene oxide, propylene oxide, styrene oxide or the like; a lactone compound such as ϵ-caprolactone, β-propiolactone, dimethylpropiolactone (pivalolactone), methylvalerolactone or the like, or the like is added thereto.

Subsequently, an active oxygen-containing compound such as an alcohol, a carboxylic acid, water or the like is added thereto to terminate the polymerization. Thereby, a functional group-containing block copolymer (II') is obtained. In the case of hydrogenation, hydrogen atoms are added thereto in the presence of a hydrogenation reaction catalyst such as a Ziegler catalyst consisting of cobalt, nickel or the like and an alkyl aluminum compound in an inert organic solvent such as n-hexane, cyclohexane or the like at the reaction temperature ranging from 20 to 150° C. under the condition of hydrogen pressure ranging from 1 to 150 kg/cm$^2$.

In addition, the block copolymer before the hydrogenation or after the hydrogenation may be modified with maleic anhydride or the like, if necessary.

The functional group-containing block copolymer (II') may contain a block copolymer which has the aforementioned polymer block (A) and polymer block (B) or a polymer block in which the aforementioned polymer block is hydrogenated, and does not have the aforementioned functional groups, in some manufacturing steps.

As the functional group-containing block copolymer (II'), a commercially available one can also be used.

The number average molecular weight of the functional group-containing block copolymer (II') preferably ranges from 15,000 to 300,000, and more preferably ranges from 20,000 to 100,000. The number average molecular weight of the functional group-containing block copolymer (II') is a value calculated on the basis of a polystyrene standard by means of gel permeation chromatography (GPC).

In addition, the melt flow rate (MFR) of the functional group-containing block copolymer (II') preferably ranges from 0.01 to 100 g/10 minutes, and more preferably ranges from 0.05 to 80 g/10 minutes. Herein, the melt flow rate (MFR) of the functional group-containing block copolymer (II') is a value measured in accordance with ASTM D-1238 at 230° C. under a load of 2.16 kg.

When the block copolymer (I/II) obtained by using the functional group-containing block copolymer (II') having the melt flow rate with the aforementioned range is blended in a non-polar thermoplastic polymer, a thermoplastic polymer composition for molding exhibiting more superior adhesive properties with silicones can be reliably obtained.

When the polyurethane block (I) or the polyurethane corresponding to the aforementioned polyurethane block (I) is formed, the components are preferably reacted in a ratio such that the isocyanate group which the organic polyisocyanate has ranges from 0.9 to 1.3 moles with respect to one mole of the active hydrogen atom which the polymer polyol and the chain extender have. When the block copolymer (I/II) having the polyurethane block (I) obtained by reacting the components in the aforementioned ratio is blended in a non-polar thermoplastic polymer, a thermoplastic polymer composition for molding exhibiting more superior adhesive properties with silicones can be reliably obtained.

Tn addition, when the polyurethane block (I) or the polyurethane corresponding to the aforementioned polyurethane block (I) is formed, the components are preferably reacted in a ratio such that the amount of nitrogen atom originated from the organic polyisocyanate ranges from 1 to 6.5% by weight with respect to the weight of the polyurethane block (I) or the polyurethane corresponding to the aforementioned polyurethane block (I). When the block copolymer (I/II) having the polyurethane block (I) obtained by reacting the components in the aforementioned ratio is blended in a non-polar thermoplastic polymer, a thermoplastic polymer composition for molding exhibiting more superior adhesive properties with silicones can be reliably obtained.

The amount of nitrogen atom originated from the organic polyisocyanate more preferably ranges from 1 to 6% by weight, further preferably ranges from 1.3 to 5.5% by weight, and in particular, preferably ranges from 1.6 to 5% by weight, with respect to the weight of the polyurethane block (I) or the polyurethane corresponding to the aforementioned polyurethane block (I).

The polyurethanes of the first and second modes for carrying out the present invention as described above exhibit superior melt-molding properties, and various types of molded bodies can be easily obtained in accordance with any molding method. In particular, the polyurethanes of the present invention exhibit non-stickiness, and for this reason, molded bodies with high performance can be manufactured with increased productivity.

In addition, the polyurethanes of the first and second modes for carrying out the present invention contain the alkenyl group-containing organopolysiloxane structure in an amount ranging from 0.01 to 20% by weight with respect to the weight of the aforementioned polyurethane. For this reason, a molded product of the aforementioned polyurethane exhibits superior adhesive properties with silicones even if a surface activation treatment is not carried out beforehand.

In addition, in accordance with the manufacturing method for the polyurethanes of the first and second modes for carrying out the present invention, the aforementioned polyurethanes can be easily manufactured.

Ink Binder

The ink binder of the present invention comprises the aforementioned polyurethane.

In the aforementioned polyurethane in which the polyol unit contains an alkenyl group-containing organopolysiloxane structure, an inclination of crystallization of the polyol unit is reduced. For this reason, the polyurethane is preferably used as the ink binder of a non-solvent type or a high solid type.

Even in the polyurethane contained in the ink binder, a polyol unit derived from a polymer polyol other than the alkenyl group-containing organopolysiloxane polyol can be provided. As the other polymer polyol used in this case, a polyester polyol in which an aliphatic diol with 5 to 12 carbon atoms having a methyl group as the side chain is preferred, such as 2-methyl-1,4-butanediol, 3-methyl-1,5-pentanediol, 2-methyl-1,8-octanediol, 2,7-dimethyl-1,8-octanediol, 2-methyl-1,9-nonanediol, 2,8-dimethyl-1,9-nonanediol or the like. In addition, a polyester polyol in which a branched aliphatic diol is used in an amount of 30% by mole or more and more preferably in an amount of 50% by mole or more, with respect to the amount of the total diol components used in the manufacture of the polyester polyol.

The aforementioned other polymer polyol has the number average molecular weight preferably ranging from 700 to 5,000, and more preferably ranging from 1,000 to 3,000.

When the number average molecular weight of the other polymer polyol is 700 or more, adhesive properties with respect to various types of plastic films of the ink binder are improved, and in addition, solubility with respect to the dilution solvent is improved. For this reason, printing applicability of the ink composition comprising the ink binder is improved. On the other hand, when the number average molecular weight of the other polymer polyol is 5,000 or less, drying properties and anti-blocking properties of the ink binder are increased, and practical usability of the ink composition comprising the ink binder is increased.

As the organic polyisocyanate used at the time of manufacturing the polyurethane contained in the ink binder, an aliphatic or alicyclic diisocyanate is preferred in view of problems of toxicity, yellowing, and adhesive properties of the ink binder. In addition, hexamethylene diisocyanate, isophorone diisocyanate, or 4,4'-dicyclohexylmethane diisocyanate is more preferable. The aforementioned polyisocyanates may be used as a single type alone or in combination with two or more types thereof.

As the chain extender as an optional component used at the time of manufacturing the polyurethane contained in the ink binder, the aforementioned chain extender can be used without particular restriction. In addition, diamines having a hydroxyl group(s) in a molecule, such as 2-hydroxyethyl ethylenediamine, 2-hydroxyethyl propylenediamine, di-2-hydroxypropyl ethylenediamine or the like can also be used together with the chain extender.

When the polyurethane contained in the ink binder is manufactured, the molecular weight of the polyurethane or the like can also be adjusted by using a monovalent alcohol such as ethanol, isopropyl alcohol or the like, a monoamine such as di-n-butylamine or the like, or the like as a polymerization terminator.

The polyurethane used in the ink binder can be manufactured by the aforementioned manufacturing method. In the aforementioned one-step method, adding the organic polyisocyanate in an organic solvent is preferred. In the aforementioned two-step method, it is preferred that the prepolymer be dissolved in an organic solvent, followed by reacting with the chain extender.

In addition, with respect to the amount of the organic polyisocyanate, a ratio is preferably used such that the molar number of the isocyanate group with respect to one mole of the active hydrogen atom of each component used in the reaction ranges from 0.9 to 1.5 moles, and is more preferably about one mole.

As the aforementioned organic solvent, conventionally known solvent for ink can be used without particular restriction. As examples thereof, mention may be made of, for example, aromatic hydrocarbons such as toluene, xylene and the like; alcohols such as methanol, ethanol, isopropanol, n-butanol and the like; ketones such as acetone, methyl ethyl ketone, methyl isobutyl ketone and the like; esters such as ethyl acetate, butyl acetate and the like; and the like. The aforementioned organic solvents can be used as a single type alone or in combination with two or more types thereof.

The number average molecular weight of the polyurethane used in the ink binder preferably ranges from 5,000 to 100,000, and more preferably ranges from 8,000 to 50,000. When the number average molecular weight of the polyurethane is 5,000 or more, the surface strength, non-stickiness, oil resistance and the like of the obtained printed products are increased. In addition, when the number average molecular weight of the polyurethane is 100,000 or less, the viscosity of the ink binder is reduced, and glossiness and re-solubility of the ink composition are improved.

In addition, the polyurethane contained in the ink binder preferably has an amino group in the molecule. The polyurethane having an amino group can be obtained by using an amine-based compound as the chain extender and/or the polymerization terminator, in an excess amount of the amino group with respect to a free isocyanate group present at the terminal of the prepolymer, in the aforementioned two-step method.

The amount of the amino group preferably ranges from 0.2 to 20 KOH mg and more preferably ranges from 1 to 10 KOH mg as an amine value with respect to 1 g of the polyurethane resin solid content in view of adhesive properties of the ink binder, non-stickiness of the obtained printed product and the like.

The ink binder of the present invention may comprise a resin other than the aforementioned polyurethane, such as nitrocellulose, polyvinyl chloride, a copolymer of vinyl chloride and vinyl acetate, polyamide, an acrylic ester-based polymer and the like.

The ink binder of the present invention may be in the form of a liquid by containing an organic solvent. As the organic solvent, one described above can be used.

The amount of the polyurethane resin solid content in the ink binder is not particularly restricted. In view of operation properties during printing and the like, the viscosity of the ink binder is preferably adjusted to range from 50 to 100,000 cps at 25° C. In order to provide the aforementioned viscosity range, the solid concentration may be set to ranging 15 to 60% by weight.

Ink Composition

The ink composition of the present invention comprises the aforementioned ink binder, a coloring agent such as a pigment or the like, and an organic solvent, and optionally comprises a surfactant for improving ink fluidities and modifying the surface film, a wax, and/or other additives as optional components.

As examples of coloring agents, mention may be made of organic pigments and inorganic pigments. As examples of organic pigments, mention may be made of, for example, phthalocyanine-based pigments, anthraquinone-based pigments, quinacridone-based pigments, and the like. As examples of inorganic pigments, mention may be made of, for example, ultramarine blue, cobalt blue, titanium yellow, chrome yellow, zinc white, red iron oxide, cinnabar, vermillion, carbon black, titanium black, bronze powder and the like.

As the organic solvent, the same organic solvent as the organic solvent used in manufacturing an ink binder can be used.

The ink composition of the present invention can be manufactured by blending all components and kneading the mixture by means of a usual apparatus for manufacturing ink such as a ball mill, an attritor, a sand mill or the like.

The ink composition of the present invention can also be formed in a two parts-type ink composition in which a polyisocyanate-based curing agent is used together therewith. As the polyisocyanate-based curing agent in the case of the two parts-type one, the aforementioned organic polyisocyanate or the like can be used. In view of convenience of handling such as toxicity, pot life or the like, an isocyanate compound having a free isocyanate group obtained from a polyol having a low molecular weight and an excess amount of an organic polyisocyanate is preferred. More particularly, a triisocyanate obtained by reacting trimethylolpropane with a diisocyanate such as 1,6-hexamethylene diisocyanate, trilene diisocyanate, isophorone diisocyanate or the like in a ratio of 3 moles of diisocyanate to 1 mole of trimethylolpropane is preferred.

A printed product obtained by the ink composition of the present invention exhibits superior adhesive properties with silicones and also exhibits superior adhesive properties with respect to a film of polyester, nylon, polypropylene or the like. In addition, the obtained printed product has superior boiling resistance, retort resistance, surface strength, non-stickiness, and oil resistance.

The ink binder and ink composition described above comprise the aforementioned polyurethane, and for this reason, a film exhibiting superior adhesive properties with silicones can be easily formed without surface-activating treatment.

Master Batch

The master batch of the present invention comprises the aforementioned polyurethane of the present invention. In the master batch of the present invention, the total amount thereof may be the polyurethane of the present invention and may comprise components which are other than the aforementioned polyurethane, in addition to the polyurethane of the present invention.

As examples of the other components described above, mention may be made of the same ones as the other thermoplastic polymers contained in the thermoplastic polymer composition described below. As examples thereof, mention may be made of a polyamide resin, a polyester resin, a polyvinylidene chloride resin, a polyvinyl chloride-based resin, a polycarbonate resin, an acrylic resin, a polyoxymethylene resin, an ethylene-vinyl acetate copolymer saponified product, a copolymer between an aromatic vinyl compound and at least one compound selected from a cyanided vinyl compound, a conjugated diene and an olefin, a polyurethane other than the polyurethane of the present invention, a polystyrene resin, an olefin-based resin and the like.

The master batch of the present invention comprises the aforementioned polyurethane, and for this reason, a thermoplastic polymer composition for molding which exhibits superior adhesive properties with silicones can be easily manufactured.

In the master batch of the present invention, an alkenyl group-containing organopolysiloxane structure is preferably contained in an amount ranging from 0.5 to 20% by weight and more preferably ranging from 5 to 20% by weight, with respect to the weight of the master batch. In accordance with the master batch comprising the alkenyl group-containing organopolysiloxane structure in the aforementioned range, at the time of manufacturing a thermoplastic polymer composition for molding described below, in the thermoplastic polymer composition for molding blended in the other thermoplastic polymers, adhesive properties with silicones can be enhanced.

Thermoplastic Polymer Composition for Molding

The thermoplastic polymer composition for molding of the present invention (hereinafter, referred to as "thermoplastic polymer composition" in some cases) comprises the aforementioned polyurethane and the other thermoplastic polymer which is other than the aforementioned polyurethane.

As examples of the other thermoplastic polymers, mention may be made of, for example, polar polymers such as a polyamide resin, a polyester resin, a polyvinylidene chloride resin, a polyvinyl chloride-based resin, a polycarbonate resin, an acrylic resin, a polyoxymethylene resin, an ethylene-vinyl acetate copolymer saponified product, a copolymer between an aromatic vinyl compound and at least one compound selected from a cyanided vinyl compound, a conjugated dine and an olefin, a polyurethane other than the polyurethane of the present invention, and the like; non-polar polymers such as a polystyrene-based resin, an olefin-based resin and the like; and the like.

In the case of using the block copolymer (I/II) which is the polyurethane according to the aforementioned second mode for carrying out the present invention as thes polyurethane, if a non-polar polymer is used as the other thermoplastic polymer, the effects can be much exhibited. In the case of using a polyurethane other than the block copolymer (I/II) according to the aforementioned second mode for carrying out the present invention as the polyurethane, if a polar polymer is used as the other thermoplastic polymer, the effects can be much exhibited.

In the thermoplastic polymer composition of the present invention, a molded body exhibiting more superior adhesive properties with silicones can be provided. For this reason, the ratio of the alkenyl group-containing organopolysiloxane structure which the polyurethane has with respect to the weight of the thermoplastic polymer composition (namely, with respect to 100% by weight of the thermoplastic polymer composition) preferably ranges from 0.02 to 3% by weight and more preferably ranges from 0.03 to 2% by weight.

The content rate of the aforementioned polyurethane (polyurethane of the present invention) in the thermoplastic polymer composition of the present invention may vary depending on the content of the alkenyl group-containing organopolysiloxane structure which the polyurethane has, and preferably ranges from 0.1 to 20% by weight and more preferably ranges from 0.2 to 15% by weight.

In addition, the thermoplastic polymer composition of the present invention may comprise various additives such as a mold release agent, a reinforcing agent, a coloring agent, a flame retardant, a UV absorber, an antioxidant, an anti-hydrolyzable improver, a fungicide, an antibacterial agent, a stabilizer and the like; various fibers such as glass fibers, polyester fibers, and the like; inorganic materials such as talc, silica and the like; various coupling agents and the like, within a range which does not impair the effects of the present invention, if necessary.

The thermoplastic polymer composition of the present invention exhibits superior melt-molding properties, and various types of molded bodies can be easily manufactured in any molding method. In particular, the thermoplastic polymer composition of the present invention exhibits non-stickiness, and for this reason, a molded body with high performance can be manufactured in high productivity.

In addition, the thermoplastic polymer composition of the present invention comprises the alkenyl group-containing organopolysiloxane structure in an amount ranging from 0.02 to 3% by weight with respect to the weight of the thermoplastic polymer composition. For this reason, a molded product of the aforementioned thermoplastic polymer composition exhibits superior adhesive properties with silicones without carrying out a surface-activation treatment beforehand.

Molded Body

First Mode for Carrying out the Present Invention

A molded body of the present invention according to the first mode for carrying out the present invention corresponds to a film or sheet comprising a member containing the polyurethane or the thermoplastic polymer composition of the present invention, and namely comprising one type of member. Hereinafter, the aforementioned "member comprising the polyurethane or the thermoplastic polymer composition" is referred to as "member A".

As examples of the method for molding the polyurethane or the thermoplastic polymer composition in order to obtain a member comprising the polyurethane or the thermoplastic polymer composition, mention may be made of an injection molding, an extrusion molding, an inflation molding, a blow molding, a calender molding, a press molding, a cast molding and the like.

Second Mode for Carrying out the Present Invention

A molded body of the present invention according to the second mode for carrying out the present invention corresponds to a film or sheet comprising the aforementioned member A and a member in the form of a layer which is adjacent to one face of the aforementioned member A and comprises a material other than the polyurethane or the thermoplastic polymer composition of the present invention, and namely, comprising two types of members. Hereinafter, the aforementioned "member in the form of a layer comprising a material other than the polyurethane or the thermoplastic polymer composition of the present invention" is referred to as "member B".

As examples of the other materials in the aforementioned member B, mention may be made of, other polymers, polymer compositions containing the other polymers, paper, fabric, metal, ceramic, wood and the like.

As examples of the other polymers, mention may be made of, for example, polar polymers such as a polyamide resin, a polyester resin, a polyvinylidene chloride resin, a polyvinyl chloride-based resin, a polycarbonate resin, an acrylic resin, a polyoxymethylene resin, an ethylene-vinyl acetate copolymer saponified product, a copolymer between an aromatic vinyl compound and at least one compound selected from a cyanide vinyl compound, a conjugated dine and an olefin, a polyurethane other than the polyurethane of the present invention, and the like; non-polar polymers such as a polystyrene-based resin, an olefin-based resin and the like; and the like.

The aforementioned members A and B may be foam products or solid products without voids. In addition, all the members may be the foam product or the solid product, or they may be a combination of the foam product and the solid product.

Each of the molded bodies according to the aforementioned first and second modes for carrying out the present invention has the aforementioned member A comprising the polyurethane or the thermoplastic polymer composition of the present invention, and for this reason, the molded bodies exhibit non-stickiness, and superior adhesive properties with silicones without carrying out a surface activation treatment.

The molded bodies of the present invention are not particularly restricted to the aforementioned modes for carrying out the present invention. For example, in the second mode for carrying out the present invention, plural members B may be provided at one side of the aforementioned member A.

In addition, the molded bodies according to the aforementioned first and second modes for carrying out the present invention are in the form of a film or a sheet. The molded bodies of the present invention may be in the other tridimensional forms.

Composite Molded Body
First Mode for Carrying out the Present Invention

A composite molded body according to the first mode for carrying out the present invention is a film or a sheet having member A and a member in the form of a layer which is adjacent to one face of the aforementioned member A and comprises a silicone, and namely, a film or a sheet comprising two types of members. Hereinafter, the "member in the form of a layer comprising a silicone" is referred to as "member C".

Member C can be manufactured by, for example, crosslinking a curable silicone composition by means of a condensation reaction, a hydrosilylation reaction, or a radical reaction with an organic peroxide to obtain a silicone cured product.

As the curable silicone composition, in view of operation properties, a liquid curable silicone composition which is in the form of a soft paste or semifluid before curing is preferably used.

As examples of the curable silicone composition crosslinking by means of the aforementioned condensation reaction, mention may be made of a condensation-curable composition which has a diorganopolysiloxane containing a hydrolyzable reaction group such as a hydroxyl group, an alkoxy group or the like as a main component, and comprises a silicon-containing compound having 3 or more groups, which will hydrolyze hydrolyzable reaction groups and be involved in condensation reaction, per molecule as a crosslinking agent, and optionally comprises a crosslinking catalyst such as a tin compound or the like, if necessary.

As examples of the curable silicone composition crosslinking by means of the aforementioned hydrosilylation reaction, mention may be made of an addition-curable composition which has a diorganopolysiloxane containing an alkenyl group such as a vinyl group or the like as a main component, comprises an organohydrogen polysiloxane having at least 2 silicon atom-bonding hydrogen atoms per molecule as a crosslinking agent, and comprises a crosslinking catalyst such as a platinum compound or the like.

As examples of the curable silicone composition crosslinking by means of the aforementioned radical reaction with an organic peroxide, mention may be made of a radical polymerization-curable composition which has a diorganopolysiloxane as a main component, and comprises an organic peroxide as a crosslinking agent.

Among these, the addition-curable silicone composition crosslinking by means of a hydrosilylation reaction is preferable since curation can be carried out at a temperature widely ranging from room temperature to 250° C., and there are no side-reaction products in accordance with the crosslinking reaction.

The curable silicone composition may be cured at room temperature such as 25° C. or may be cured by heating at a temperature ranging from 60 to 130° C.

The composite molded body in accordance with the mode for carrying out the present invention can be manufactured for example, by a method described below.

(a) A method in which a curable silicone composition is supplied to member A to cover and cure.

(b) A method in which a curable silicone composition is filled in a mold under the condition in which member A is inserted in the mold, and adhering and/or curing are/is carried out.

(c) A method in which the polyurethane of the present invention or the thermoplastic polymer composition of the present invention and a thermoplastic or semi-solid silicone are co-extrusion molded.

(d) A method in which a molten product obtained by melting the polyurethane of the present invention or a molten product obtained by melting the thermoplastic polymer composition of the present invention is supplied on member C to cover.

(e) A method in which the aforementioned ink composition is printed on member C and cured.

If the manufacturing methods (a) to (c) are used, the composite molded body according to the first mode for carrying out the present invention can be easily manufactured.

Second Mode for Carrying out the Present Invention

The composite molded body of the present invention according to the second mode for carrying out the present invention is a film or a sheet having member B, member A which is adjacent to the aforementioned member B, and member C which is adjacent to the aforementioned member A, and namely, comprising 3 types of members.

The composite molded body of the present mode for carrying out the present invention can be manufactured, for example, by the following method.

(f) A method in which in the aforementioned manufacturing method (a) or (b) for obtaining the composite molded body according to the first mode for carrying out the present invention, member B is laminated on member A beforehand.

(g) A method in which in the manufacturing method (a), (b), (c), (d), or (e) for obtaining the composite molded body according to the first mode for carrying out the present invention, a laminate of member A and member C is obtained, followed by laminating member B on member A.

(h) A method in which the aforementioned polyurethane or the thermoplastic polymer composition is laminated on member B to cover and form member A, followed by supplying a curable silicone composition on the aforementioned member A to cover and cure.

(i) A method in which the aforementioned ink composition is printed on member B, and cured to form a film (member A), followed by supplying a curable silicone composition on the aforementioned film to cover and cure.

When the manufacturing method (f), (g), (h) or (i) is used, the composite molded body according to the second mode for carrying out the present invention can be easily obtained.

Third Mode for Carrying out the Present Invention

The composite molded body of the present invention according to the third mode for carrying out the present invention is a film or sheet having member A and two members C which interleave the aforementioned member A.

The composite molded body of the present mode for carrying out the present invention can be manufactured by, for example, the following method.

(j) A method in which a thermoplastic or semisolid silicone, the polyurethane or the thermoplastic polymer composition of the present invention, and a thermoplastic or semisolid silicone are co-extrusion-molded.

(k) A method in which the manufacturing method (a) or (b) for obtaining the composite molded body of the first mode for carrying out the present invention is carried out on both faces of member A.

(l) A method in which the manufacturing method (d) or (e) for obtaining the composite molded body of the first mode for carrying out the present invention is carried out, followed by carrying out the manufacturing method (a) or (b).

When the manufacturing methods (j) to (l) are used, the composite molded body in accordance with the third mode for carrying out the present invention can be easily obtained.

Fourth Mode for Carrying out the Present Invention

The composite molded body of the present invention in accordance with the fourth mode for carrying out the present invention is a film or sheet having member C and two members A which interleave the aforementioned member C.

The composite molded body of the present mode for carrying out the present invention can be manufactured by, for example, the following method.

(m) A method in which the polyurethane of the present invention or the thermoplastic polymer composition of the present invention, a thermoplastic or semisolid silicone, and the polyurethane of the present invention or the thermoplastic polymer composition of the present invention are co-extrusion-molded.

(n) A method in which the manufacturing method (d) or (e) for obtaining the composite molded body of the first mode for carrying out the present invention is carried out on both faces of member C.

(o) A method in which the manufacturing method (a), (b), (c), (d) or (e) for obtaining the composite molded body of the first mode for carrying out the present invention is carried out, followed by carrying out the manufacturing method (d) or (e)

When the manufacturing methods (m) to (o) are used, the composite molded body in accordance with the fourth mode for carrying out the present invention can be easily obtained.

In the case in which a composite molded body of the present invention, including the composite molded bodies in accordance with the aforementioned first to fourth modes for carrying out the present invention, is a laminate structure comprising two or more members, the thickness of each member is not particularly restricted, and may be selected in accordance with types of the polyurethanes of the present invention, the thermoplastic polymer compositions of the present invention, silicones and the like which constitute each of the members, the total number of the layers, usage of the laminate structure and the like. In view of ease of manufacturing the laminate structures, adhesive power between layers and the like, the thickness of member A is preferably 10 µm or more, and the thickness of member C is preferably 10 µm or more.

The aforementioned member C may be a foamed product or a solid product without voids. In the case of comprising two or more members, all the members may be a foamed product or a solid product, or they may be a combination of the foam product and the solid product.

In the composite molded bodies in accordance with the first to fourth modes for carrying out the present invention, member A and member C are compounded. For this reason, superior abrasion resistance, superior mechanical properties, superior flexible properties, superior oil resistance, superior water resistance, and superior elasticity recovery properties are exhibited, residual strain is reduced, appropriate flexible properties are provided, surface smoothness is increased, and good surface conditions are exhibited.

Other Modes for Carrying out the Present Invention

The composite molded body of the present invention may be in the form other than the aforementioned mode for carrying out the present invention, in which with respect to at least one member of members A to C, two or more members A to C may be provided. For example, a composite molded body in which member A and member C are mutually arranged, and which has two or more members A and two or more members C (in total, four members or more) (the number of members A may not be the same as the number of members C, and the difference between the number of member A and the number of member C may be one).

In the case of having two or more members A, the aforementioned members A may be the same or different. In the case of having two or more members B, the aforementioned members B may be the same or different. In the case of having two or more members C, the aforementioned members C may be the same or different.

The composite molded bodies of the aforementioned first to fourth modes for carrying out the present invention are in the form of a film or a sheet, but the composite molded bodies of the present invention may be in other three-dimensional forms.

The molded bodies and composite molded bodies of the present invention can be preferably used in automobile interior parts such as instrument panels, center panels, center console boxes, door trims, pillars, assist grips, handles, airbag covers and the like; automobile exterior parts such as window moldings and the like; parts of home electronics such as cleaner bumpers, refrigerator doorstops, camera grips, electric tool grips, home cooking devices, remote control switches, various keycaps of office automation equipments, various key sheets and/or keyboards for use in push-button switches of mobile phones, home electronics and the like, housings and the like; sporting goods such as hydroscopes and the like; various covers; various industrial components with packings for the purposes of abrasion resistance, sealing properties, sound insulating properties, vibration absorbing properties, and the like; curl code wire coverings; belts; films or sheets for use in various containers; hoses; tubes; sound absorbing gears; shoe soles; watch bands; conveyer belts; laminate products; various electric and/or electronic parts; various vibration controlling material; and the like.

EXAMPLES

Hereinafter, the present invention is described in detail with Examples. It should be understood that the present invention is not restricted thereto. "Silicone Elastomer Composition" of the Examples described below is one mode of the curable silicone composition described above.

Preparation Example 1

Preparation of Silicone Elastomer Composition 1

A dimethylpolysiloxane of which both terminals of a molecular chain are capped with dimethylvinylsiloxy groups, having a viscosity of 50,000 mPa·s (vinyl group content=0.08% by weight) (100 parts by weight), fumed silica having a BET specific surface area of 230 m²/g (42 parts by weight), hexamethyldisilazane (7 parts by weight), water (2 parts by weight), and a copolymer of methylvinylsiloxane and dimethylsiloxane of which both terminals of a molecular chain are capped with hydroxyl groups having a viscosity of 20 mPa·s (vinyl group content=11% by weight) (0.2 parts by weight) were placed in a kneader mixer, and mixed at room temperature until a uniform mixture was obtained. Subsequently, the mixture was subjected to a heat treatment for 2 hours at 180° C. under reduced pressure. Thereby, a silica master batch was prepared.

In 100 parts by weight of the master batch prepared as described above, a dimethylpolysiloxane of which both terminals of a molecular chain are capped with dimethylvinylsiloxy groups, having a viscosity of 10,000 mPa·s (vinyl group content=0.13% by weight) (12 parts by weight), a copolymer of methylhydrogensiloxane and dimethylsiloxane of which both terminals of the molecular chain are capped with trimethylsiloxy groups, having an average of 5 silicon atom-bonding hydrogen atoms in one molecule (silicon atom-bonding hydrogen atom content=0.7% by weight) with a viscosity of 5 mPa·s (1.4 parts by weight), and 3,5-dimethyl-1-hexyn-3-ol (0.02 parts by weight) as a curing reaction controller were mixed. Finally, a solution of a platinum complex with 1,3-divinyl-1,1,3,3-tetramethyldisiloxane in which the platinum content is 0.7% by weight (0.11 parts by weight) was mixed therewith for 5 minutes at room temperature. Thereby, Silicone Elastomer Composition 1 was prepared.

Preparation Example 2

Preparation of Silicone Elastomer Composition 2

A dimethylpolysiloxane of which both terminals of a molecular chain are capped with dimethylvinylsiloxy groups, having a viscosity of 50,000 mPa·s (vinyl group content=0.08% by weight) (100 parts by weight), fumed silica having a BET specific surface area of 400 m²/g (50 parts by weight), hexamethyldisilazane (10 parts by weight), tetramethyldivinyldisilazane (0.4 parts by weight), water (2 parts by weight), and a copolymer of methylvinylsiloxane and dimethylsiloxane of which both terminals of a molecular chain are capped with hydroxyl groups, having a viscosity of 20 mPa·s (vinyl group content=11% by weight) (0.3 parts by weight) were placed in a kneader mixer, and mixed at room temperature until a uniform mixture was obtained. Subsequently, the mixture was subjected to a heat treatment for 2 hours at 180° C. under reduced pressure. Thereby, a silica master batch was prepared.

In 100 parts by weight of the master batch prepared as described above, a dimethylpolysiloxane of which both terminals of a molecular chain are capped with dimethylvinylsiloxy groups, having a viscosity of 10,000 mPa·s (vinyl group content=0.13% by weight) (4.7 parts by weight), a copolymer of methylvinylsiloxane and dimethylsiloxane of which both terminals of the molecular chain are capped with dimethylvinylsiloxy groups having a viscosity of 350 mPa·s (vinyl group content=1.0% by weight) (7 parts by weight), and a copolymer of methylhydrogensiloxane and dimethylsiloxane of which both terminals of the molecular chain are capped with trimethylsiloxy groups having an average of 10 silicon atom-bonding hydrogen atoms in one molecule (silicon atom-bonding hydrogen atom content=0.8% by weight) with a viscosity of 15 mPa·s (1.7 parts by weight), and 3,5-dimethyl-1-hexyn-3-ol (0.02 parts by weight) as a curing reaction controller were mixed. Finally, a solution of a platinum complex with 1,3-divinyl-1,1,3,3-tetramethyldisiloxane in which the platinum content is 0.7% by weight (0.11 parts by weight) was mixed therewith for 5 minutes at room temperature. Thereby, Silicone Elastomer Composition 2 was prepared.

Preparation Example 3

Preparation of Silicone Elastomer Composition 3

Silicone Elastomer Composition 3 was prepared in the same manner as that described in the aforementioned Preparation Example 2, with the exception of replacing the addition amount of the copolymer of methylhydrogensiloxane and dimethylsiloxane of which both terminals of the molecular chain are capped with trimethylsiloxy groups having an average of 10 silicon atom-bonding hydrogen atoms in one molecule (silicon atom-bonding hydrogen atom content=0.8% by weight) with a viscosity of 15 mPa·s with 2.8 parts by weight in the aforementioned Preparation Example 2.

Abbreviations for the compounds used in the following Examples and Comparative Examples and the contents thereof are indicated below.

<<Alkenyl Group-containing Diorganopolysiloxane of Which Both Terminals of a Molecular Chain are Capped with Hydroxyl Groups>>

POG-1: Polymethylvinylsiloxane of which both terminals of the molecular chain are capped with silicon atom-bonding hydroxyl groups having a number average molecular weight of 1,700 (vinyl group-content=30% by weight)

POG-2: Copolymer of methylvinylsiloxane and dimethylsiloxane of which both terminals of the molecular chain are capped with silicon atom-bonding hydroxyl groups having a number average molecular weight of 400 (vinyl group-content=11% by weight)

<<Polymer polyol Other than the Alkenyl Group-containing Diorganopolysiloxane of Which Both Terminals of a Molecular Chain are Capped with Hydroxyl Groups>>

POH-1: Polyester diol having a number average molecular weight of 1,000, produced by reacting 1,4-butanediol and adipic acid.

POH-2: Polyester diol having a number average molecular weight of 3,500, produced by reacting 3-methyl-1,5-pentanediol and adipic acid.

<<Organic Polyisocyanate>>

MDI: 4,4'-diphenylmethane diisocyanate

IPDI: Isophorone diisocyanate

<<Chain Extender Other than the Alkenyl Group-Containing Diorganopolysiloxane of Which Both Terminals of a Molecular Chain are Capped with Hydroxyl Groups>>

BD: 1,4-butanediol

IPDA: Isophorone diamine

<<Catalyst for Urethane-forming Reaction>>

TI: Tetraisopropyl titanate

<<Functional Group-containing Block Copolymer>>

F-TPS: Hydrogenenated triblock copolymer having a hydroxyl group at one terminal of the molecule and having a polystyrene-block-poly(isoprene/butadiene)-block-polystyrene type structure (number average molecular weight: 50,000, styrene content: 30% by weight, hydrogenation index in the poly(isoprene/butadiene) block: 98% by mole, a ratio of isoprene and butadiene: 50/50 (weight ratio), average number of hydroxyl groups in one molecule: 0.9, manufactured by using styrene, isoprene and butadiene as raw materials in accordance with a method described in Reference Example 1 of Japanese Unexamined Patent Application, First Publication No. H10-139963).

The aforementioned F-TPS comprised a block copolymer having a hydroxyl group at one terminal of the molecule (TPS-OH (number average molecular weight: 50,000, styrene content: 30% by weight, hydrogenation index in poly (isoprene/butadiene) block: 98% by mole, ratio of isoprene and butadiene: 50/50 (weight ratio)) and a block copolymer having no hydroxyl groups in the molecule (TPS (number average molecular weight: 50,000, styrene content: 30% by weight, hydrogenation index in poly(isoprene/butadiene) block: 98% by mole, ratio of isoprene and butadiene: 50/50 (mass (weight) ratio)) (TPS-OH/TPS=9/1 (molar ratio)).

Example 1

Manufacture of Polyurethane (1)

An alkenyl group-containing diorganopolysiloxane of which both terminals of a molecular chain are capped with hydroxyl groups (POG-1), a polymer polyol containing 10 ppm of tetraisopropyl titanate (TI) (POH-1), 1,4-butanediol (BD) and 4,4'-diphenylmethane diisocyanate (MDI) were continuously supplied to a biaxial screw extruder so that the molar ratio of POG-1:POH-1:BD:MDI was 0.001:1.00:2.11:3.08 (nitrogen atom-containing ratio=4.4% by weight) and the total of the supplied amount thereof was 200 g/min. The biaxial screw extruder was equipped with a screw rotating the same axial direction (30 mmφ, L/D=36), and a heating zone was divided into three band areas of a front part, a center part, a rear part. In addition, each component was continuously supplied to the front part of the heating zone.

A polyurethane was manufactured by continuously carrying out a melt-polymerization at 260° C. using the aforementioned extruder to carry out a polyurethane-forming reaction. The obtained melt product of the polyurethane was continuously extruded in water in the form of a strand, followed by cutting by a pelletizer to obtain pellets. The aforementioned pellets were dehumidified for 4 hours at 80° C. Thereby, polyurethane (hereinafter, indicated as "Polyurethane (1)") was obtained.

Examples 2 and 3

Manufacture of Polyurethanes (2) and (3)

Polyurethanes (2) and (3) were manufactured by the same method as that described in Example 1, with the exception of replacing a proportion of the alkenyl group-containing diorganopolysiloxane of which both terminals of a molecular chain are capped with hydroxyl groups (POG-2), the polymer polyol (POH-1) containing 10 ppm of tetraisopropyl titanate (TI), 1,4-butanediol (BD) and 4,4'-diphenylmethane diisocyanate (MDI) with the proportions indicated in the following Table 1.

Comparative Example 1

Manufacture of Polyurethane (C1)

Polyurethane (C1) was manufactured in the same manner as that described in Example 1, with the exception of continuously supplying the polymer polyol (POH-1) containing 10 ppm of tetraisopropyl titanate (TI), 1,4-butanediol (BD) and 4,4'-diphenylmethane diisocyanate (MDI) in a molar ratio of POH-1:BD:MDI=1.00:2.11:3.08 (nitrogen atom-content index=4.4% by weight) and setting the total supplying amount thereof to 200 g/min in a biaxial screw extruder.

With respect to the Polyurethanes in accordance with Examples 1 to 3 and Comparative Example 1, the melt viscosity of the Polyurethane, the logarithmic viscosity of the Polyurethane, and adhesive properties between a silicone and a molded body formed from the Polyurethane were measured or evaluated in the following methods. The measurement results and evaluation results are shown in Table 1.

(1) Melt Viscosity of Polyurethane

The melt viscosity of the Polyurethane which had been dried under reduced pressure (1.3 kPa or less) for one hour at 95° C. was measured by means of a Kouka-type flow tester (manufactured by Shimadzu Corporation) under the conditions of load=490.3 N (50 kgf), nozzle size=diameter of 1 mm×length of 10 mm, and temperature=200° C.

(2) Logarithmic Viscosity of Polyurethane

The aforementioned Polyurethane was dissolved in DMF so that the concentration was 0.5 g/dl, and the time of flow of the Polyurethane solution at 30° C. was measured by means of an Ubbelohde viscosimeter. The logarithmic viscosity ($\eta_{inh}$) of the Polyurethane was obtained in accordance with the following equation.

$$\text{Logarithmic viscosity of Polyurethane } (\eta_{inh}) = [\ln(t/t_0)]/c$$

wherein t represents a time of flow (sec) of a Polyurethane solution; $t_0$ represents of a time of flow (sec) of a solvent (DMF); and c represents a concentration of a Polyurethane solution (g/dl).

(3) Adhesive Properties Between Silicones and a Molded Body Obtained by Polyurethane The aforementioned Polyurethane obtained in each of Examples 1 to 3 and Comparative Example 1 was subjected to extrusion molding by means of a T-die extrusion-molding device (25 mmφ, cylinder temperature=180 to 200° C., and die temperature=200° C.), and cooled by means of a cooling roller at 30° C., followed by rolling up. Thereby, a film having a thickness of 100 μm was obtained. A test piece having a width of 25 mm was manufactured from the aforementioned film.

Subsequently, a film formed from polyethylene terephthalate with a thickness of 0.05 mm for use in lining of a silicone rubber was arranged at the bottom part of a die for a compression molding having a size of cavity of 90×190×2 mm.

Subsequently, Silicone Elastomer Composition 1, 2 or 3 in the form of a liquid prepared in the aforementioned Preparation Example 1, 2 or 3 was filled on the aforementioned film, and a molded film of the aforementioned polyurethane was overlapped on the filled Silicone Elastomer Composition. Subsequently, heat compression was carried out for 10 minutes at a temperature ranging from 110° C. to 120° C. by means of a hot press apparatus with a mold clumping force of 50 ton to cure the silicone rubber. Thereby, a composite molded body having a member formed from the polyurethane (film) and a member formed from the silicone was obtained. The obtained composite molded body was removed from the die, and subsequently, cut into pieces with a width of 25 mm so that the width was equal to the width of the molding film of the polyurethane.

In addition, a resistance value (adhesive strength) at the time of stripping between the members of the aforementioned composite molded body was measured by means of an "Autograph Measuring Device AGS-1kNG" manufactured by Shimadzu Corporation at room temperature under the condition of a tensile rate of 50 mm/min, and was used as an index of adhesive properties.

The case in which the member (film) formed from the Polyurethane was broken during the tensile test due to sufficiently increased adhesive properties, was evaluated as "film fracture".

TABLE 1

|  | Example | | | Comparative Example |
|---|---|---|---|---|
|  | 1 | 2 | 3 | 1 |
| Polyurethane raw materials: | | | | |
| POG-1 (molar ratio) | 0.001 | | | |
| POG-2 (molar ratio) | | 0.006 | 0.018 | |
| POH-1 (molar ratio) | 1.00 | 1.00 | 1.00 | 1.00 |
| BD (molar ratio) | 2.11 | 2.11 | 2.11 | 2.11 |
| MDI (molar ratio) | 3.08 | 3.08 | 3.08 | 3.08 |
| Content rate of alkenyl group-containing organopolysiloxane structure *1) (% by weight) | 0.09 | 0.12 | 0.37 | 0 |
| Content of nitrogen atom (% by weight) | 4.4 | 4.4 | 4.4 | 4.4 |
| Melt viscosity of Polyurethane (Pa·s) | 1,090 | 1,300 | 560 | 2,030 |
| Logarithm viscosity of Polyurethane (dl/g) | 0.75 | 0.78 | 0.63 | 0.87 |
| Adhesive strength with silicone: Use of the silicone of Preparation Example 1 (N/2.5 cm) | 21 | >50 film fracture | 40 | 6 |
| Adhesive strength with silicone: Use of the silicone of Preparation Example 3 (N/2.5 cm) | >100 film fracture | >100 film fracture | >100 film fracture | 5 |

*1) Rate with respect to the weight of the polyurethane

From the results shown in Table 1, it can be seen that in the Polyurethanes according to Examples 1 to 3 in which the content of the alkenyl group-containing organopolysiloxane structure was 0.01% by weight or more, sufficient adhesive properties with respect to silicones could be obtained.

On the other hand, in the Polyurethane according to Comparative Example 1, containing no alkenyl group-containing organopolysiloxane structure, insufficient adhesive properties with respect to silicones were obtained.

Example 4

(a) Preparation of Ink Binder (i) 1.0 part by weight of an alkenyl group-containing diorganopolysiloxane (POG-1) in which both terminals of the molecular chain are capped with hydroxyl groups, 349.5 parts by weight of a polymer polyol (POH-2) containing 10 ppm of tetraisopropyl titanate (TI), and 44.6 parts by weight of isophorone diisocyanate (IPDI) were placed in a round-bottomed flask equipped with a stirrer and a thermometer, and they were uniformly mixed. Subsequently, the mixture was reacted for 4 hours at 80° C. under a nitrogen stream. Thereby, a prepolymer having an isocyanate group at the terminal was prepared.

(ii) 737 parts by weight of methyl ethyl ketone was added to the prepolymer obtained in above (i), and the mixture was uniformly dissolved. Subsequently, a solution of a chain extender obtained by dissolving 14.5 parts by weight of isophorone diamine in 219 parts by weight of isopropanol was added thereto to carry out chain extending. Thereby, a polyurethane solution in which a concentration of a solid content (concentration of polyurethane) was 30% by weight and a viscosity was 1,000 cP/25° C. (hereinafter, the aforementioned polyurethane solution is referred to as "ink binder") was obtained.

The number average molecular weight of the obtained polyurethane was 17,000 and an amine value with respect to 1 g of polyurethane was 0.2 KOH mg/g.

(b) Preparation of Ink Composition 100 parts by weight of the ink binder obtained in the aforementioned (a), 75 parts by weight of titanium oxide ("TIPAQUE R-550" manufactured by Ishihara Sangyo Kaisha Ltd.), 50 parts by weight of ethyl acetate, and 50 parts by weight of isopropanol were placed in a small-size ball mill, and the mixture was kneaded for 24 hours. Thereby, an ink composition was obtained.

(c) Evaluation of a Cured Film of the Ink Composition and Adhesive Properties with Silicones The aforementioned ink composition was applied on a film formed from the Polyurethane produced in the evaluation of the adhesive properties with silicones in Example 1, and then dried to form a cured film. On the surface of the aforementioned cured film, Silicone Elastomer Composition 1 in the form of a liquid prepared in the aforementioned Preparation Example 1 was applied, and allowed to stand for 30 minutes in a hot-air drier at 100° C. Thereby, a composite molded body was obtained.

An adhesive tape (fabric adhesive tape LS No. 101, manufactured by Nichiban Co., Ltd.) was adhered to the surface to which the silicone had been applied of the obtained composite molded body. The resistance value (adhesive strength) at the time of stripping off the aforementioned adhesive tape was measured by means of "Autograph Measurement Device IS-500D" manufactured by Shimadzu Corporation under the condition of a tension rate of 50 mm/min at room temperature. The obtained value was used as an index of adhesive property.

In the present Example, the interface between the cured film of the ink composition and the silicone layer was strongly adhered. In the stripping test, the silicone layer was broken. In addition, the adhesive strength at the time of stripping off was an increased value exceeding 50 N/2.5 cm.

Example 5

Preparation of Polyurethane (4)

Polyurethane (4) was obtained in the same manner as that described in Example 1, with the exception of continuously supplying the alkenyl group-containing diorganopolysiloxane of which both terminals of a molecular chain are capped with hydroxyl groups (POG-1), the polymer polyol (POH-1) containing 10 ppm of tetraisopropyl titanate (TI), 1,4-butanediol (BD) and 4,4'-diphenylmethane diisocyanate (MDI) in a molar ratio of POG-1:POH-1:BD:MDI=0.13:1.00:2.63:3.76 (the content rate of the alkenyl group-containing organopolysiloxane structure in polyurethane=9.23% by weight, and the content rate of the nitrogen atom in polyurethane=4.4% by weight), to a biaxial screw extruder.

The melt viscosity and logarithmic viscosity of the obtained Polyurethane (4) were measured in the same manner as that described in Examples 1 to 3 and Comparative Example 1. As a result, the melt viscosity was 380 Pa·s, and the logarithmic viscosity was 0.60 dl/g.

Example 6

Preparation of Polyurethane (5)

Polyurethane (5) was obtained in the same manner as that described in Example 1, with the exception of continuously supplying the alkenyl group-containing diorganopolysiloxane of which both terminals of a molecular chain are capped with hydroxyl groups (POG-2), polymer polyol (POH-1) containing 10 ppm of tetraisopropyl titanate (TI), 1,4-butanediol (BD) and 4,4'-diphenylmethane diisocyanate (MDI) in a molar ratio of POG-2:POH-1:BD:MDI=0.06:1.00:2.82:3.77 (the content rate of the alkenyl group-containing organopolysiloxane structure in polyurethane=1.08% by weight, and the content rate of the nitrogen atom in polyurethane=4.8% by weight) to a biaxial screw extruder.

The melt viscosity and logarithmic viscosity of the obtained Polyurethane (5) were measured in the same manner as that described in Examples 1 to 3 and Comparative Example 1. As a result, the melt viscosity was 1,800 Pa·s, and the logarithmic viscosity was 0.83 dl/g.

In addition, an adhesive property between a molded body obtained from Polyurethane (5) and a silicone obtained from Silicone Elastomer Composition 3 prepared in Preparation Example 3 was evaluated in the same manner as that described in Examples 1 to 3 and Comparative Example 1. As a result, the adhesive strength was 30 N/2.5 cm.

Example 7

Preparation of Thermoplastic Polymer Composition

Polyurethane (C2) was obtained in the same manner as that described in Example 1, with the exception of continuously supplying the polymer polyol (POH-1) containing 10 ppm of tetraisopropyl titanate (TI), 1,4-butanediol (BD) and 4,4'-diphenylmethane diisocyanate (MDI) in a molar ratio of POH-1:BD:MDI=1.00:2.82:3.76 (content rate of a nitrogen atom=4.8% by weight) so that the total supplied amount thereof was 200 g/min, to a biaxial screw extruder.

The melt viscosity and logarithmic viscosity of the obtained Polyurethane (C2) were measured in the same manner as that described in Examples 1 to 3 and Comparative Example 1. As a result, the melt viscosity was 2,010 Pa·s, and the logarithmic viscosity was 0.80 dl/g.

A mixture consisting of 99.5 parts by weight of the aforementioned Polyurethane (C2) as a thermoplastic polymer and 0.5 parts by weight of Polyurethane (4) as a master batch was melt-kneaded by means of a uniaxial extrusion molder (25 mmφ, temperature of the cylinder=205 to 215° C., temperature of the die=205 to 210° C., rotation number of the gear pump=15 rpm). Subsequently, by discharging from a T-die (lip width: 0.7 mm and die width: 350 mm) equipped in the extrusion molder, a film with a thickness of 100 μm formed from the thermoplastic polymer composition was produced.

Examples 8 to 10 and Comparative Examples 2 and 3

A film having a thickness of 100 μm consisting of a thermoplastic polymer composition in the same manner as that described in Example 7, with the exception of using Polyurethane (C2) obtained in Example 7'as a thermoplastic polymer and Polyurethane (4) obtained in Example 5 or Polyurethane (5) obtained in Example 6 as a master batch in a ratio shown in Table 2 or 3 described below.

With respect to the thermoplastic polymer compositions obtained in Examples 7 to 10 and Comparative Examples 2 and 3, the adhesive properties between a silicone and a molded body obtained by the aforementioned thermoplastic polymer composition were evaluated in the following manner.

A test specimen having a width of 25 mm was prepared from a film formed from the thermoplastic polymer composition comprising the polyurethane obtained in each of Examples 7 to 10 and Comparative Examples 2 and 3.

Subsequently, a film made of polyethylene terephthalate having a thickness of 0.05 mm for a backing of a silicone rubber was arranged at the bottom part of a mold for use in compression molding having a cavity size of 90×190×2 mm.

Subsequently, on the aforementioned film, Silicone Elastomer Composition 2 or 3 in the form of a liquid prepared by the aforementioned Preparation Example 2 or 3 was filled, and a molding film of the aforementioned thermoplastic polymer composition was overlapped on the filled Silicone Elastomer Composition. Subsequently, the laminate was heat-compressed for 10 minutes at the temperature ranging from 110° C. to 120° C. by means of a thermal pressing machine with mold Cramping force of 50 tons to cure the silicone rubber. The obtained composite molded body was removed from the mold, and then cut into pices with a width 25 mm so that the composite molded body had the same width as that of the molded film of the thermoplastic polymer composition. Thereby, a composite molded body having a member (film) comprising the thermoplastic polymer composition and a member comprising the silicone was obtained.

The resistance value (adhesive strength) at the time of stripping between both the members of the aforementioned composite molded body was measured by means of an "Autograph Measuring Device AGS-1kNC" manufactured by Shimadzu Corporation at room temperature under the condition of a tensile rate of 50 mm/min, and was used as an index of adhesive properties.

The case in which the member (film) formed from the thermoplastic polymer composition was broken during the tensile test due to sufficiently increased adhesive properties, was evaluated as "film fracture".

TABLE 2

| | Example | | | |
|---|---|---|---|---|
| | 7 | 8 | 9 | 10 |
| Polyurethane (C2) (parts by weight) | 99.5 | 95.0 | 95.0 | 50.0 |
| Polyurethane (4) (parts by weight) | 0.5 | 5.0 | | |
| Polyurethane (5) (parts by weight) | | | 5.0 | 50.0 |
| Content rate *[1] of alkenyl group-containing organopolysiloxane structure (% by weight) | 0.046 | 0.46 | 0.054 | 0.54 |
| Adhesive strength with silicone: Use of silicone of Preparation Example 2 (N/2.5 cm) | (untested) | (untested) | >120 film fracture | >100 film fracture |

TABLE 2-continued

| | Example | | | |
|---|---|---|---|---|
| | 7 | 8 | 9 | 10 |
| Adhesive strength with silicone: Use of silicone of Preparation Example 3 (N/2.5 cm) | 40 | >67 film fracture | >75 film fracture | >120 film fracture |

*[1]) Rate with respect to the weight of the thermoplastic polymer composition

TABLE 3

| | Comparative Example | |
|---|---|---|
| | 2 | 3 |
| Polyurethane (C2) (parts by weight) | 99.9 | 99.0 |
| Polyurethane (4) (parts by weight) | 1.0 | |
| Polyurethane (5) (parts by weight) | | 1.0 |
| Content rate *[1]) of alkenyl group-containing organopolysiloxane structure (% by weight) | 0.009 | 0.011 |
| Adhesive strength with silicone: Use of silicone of Preparation Example 2 (N/2.5 cm) | (untested) | 5 |
| Adhesive strength with silicone: Use of silicone of Preparation Example 3 (N/2.5 cm) | 0 | 0 |

*[1]) Rate with respect to the weight of the thermoplastic polymer composition

From the results of Tables 2 and 3, it can be seen that in the thermoplastic polymer compositions of Examples 7 to 10 in which the content of the alkenyl group-containing diorganopolysiloxane was 0.02% by weight or more, sufficient adhesive properties with respect to silicones could be obtained.

On the other hand, in the thermoplastic polymer compositions of Comparative Examples 2 and 3 in which the content of the alkenyl group-containing diorganopolysiloxane was less than 0.02% by weight, the adhesive properties with respect to silicones were insufficient.

Example 11

Preparation of Block Copolymer-Type Polyurethane (1)

A polyurethane-forming reaction was carried out in the same manner as that described in Example 1, with the exception of continuously supplying the alkenyl group-containing diorganopolysiloxane of which both terminals of a molecular chain are capped with hydroxyl groups (POG-1), polyol (POH-1) containing 10 ppm of tetraisopropyl titanate (TI), 1,4-butanediol (BD) and 4,4'-diphenylmethane diisocyanate (MDI) in a molar ratio of POG-1:POH-1:BD:MDI=0.13: 1.00:2.63:3.76 (content rate of the alkenyl group-containing organopolysiloxane structure in polyurethane block=9.23% by weight, and content rate of nitrogen atom=4.4% by weight) so that the total supplied amount was 100 g/min, to a biaxial screw extruder.

In addition, to the central part of a heating zone of the aforementioned biaxial screw extruder, F-TPS was supplied in 102 g/min, to react with the reaction product obtained by the aforementioned polyurethane forming reaction. The obtained molten product was continuously extruded in the form of strands in water. Subsequently, the extruded product was cut by means of a pelletizer to obtain pellets. The pellets were subjected to dehumidification for 4 hours at 80° C. Thereby, a mixture containing Block Copolymer-Type Polyurethane (1) was obtained.

The melt viscosity of the obtained mixture was measured in the same manner as that described in Examples 1 to 3 and Comparative Example 1 (the measurement temperature was 220° C.) As a result, the melt viscosity was 530 Pa·s.

From a part of the obtained mixture, a polyurethane which was not the block copolymer-type polyurethane was removed by extraction with dimethylformamide. Subsequently, unreacted TPS-OH and TPS were removed by extraction with cyclohexane. The residual solid content was dried. Thereby, a Block Copolymer-Type Polyurethane (1) was obtained.

As a result of analysis by means of $^1$H-NMR, it can be seen that the obtained Block Copolymer-Type Polyurethane (1) was a diblock copolymer consisting of a block constituted of a unit of POG-1, a unit of POH-1, a unit of BD and a unit of MDI (Polyurethane Block (I)) and a block having a polystyrene block-hydrogenated poly(isoprene/butadiene) block-polystyrene block type structure (Addition Polymerization-Based Block (II)).

As a result of a GPC analysis, it can be seen that an extract with cyclohexane contained a triblock copolymer having one block consisting of a unit of POG-1, a unit of POH-1, a unit of BD and a unit of MDI (Polyurethane Block (I)) and two blocks having a polystyrene-block-hydrogenated poly(isoprene/butadiene)-block-polystyrene type structure (Addition Polymerization-Based Block (II)).

With respect to the content rates of the diblock copolymer, the polyurethane which was not the block copolymer-type polyurethane, extracted with dimethylformamide, the TPS-OH, the TPS and the triblock copolymer, extracted with cyclohexane, which were contained in the mixture, in the case of 100% by weight of the aforementioned mixture, the content rate of the diblock copolymer was 21% by weight, the content rate of the polyurethane which was not the block copolymer-type polyurethane was 42% by weight, the content rate of the TPS-OH was 0% by weight, the content rate of the TPS was 5% by weight, and the content rate of the triblock copolymer was 33% by weight.

The aforementioned Addition Polymerization-Based Blocks (II) in the aforementioned diblock copolymer and triblock copolymer had the same structure as that of TPS. In addition, the number average molecular weight of the aforementioned diblock copolymer was 127,900.

99.0 parts by weight of Polyurethane (C2) obtained in Example 7 as a thermoplastic polymer and 1.0 part by weight of the mixture containing Block Copolymer-Type Polyurethane (1) obtained above as a master batch were mixed. The mixture was melt-kneaded by means of a uniaxial extrusion molder (25 mmϕ, temperature of the cylinder=205 to 215° C., temperature of the die=205 to 210° C., and rotation number of the gear pump=15 rpm). Subsequently, the mixture was extruded from a T-die (lip width=0.7 mm, die width=350 mm) fixed to the extruder, and thereby, a film with a thickness of 100 μm formed from the thermoplastic polymer composition was obtained. A test piece with a width of 25 mm was prepared from the aforementioned film.

The adhesive property between the obtained film (test piece) formed from the thermoplastic polymer composition and the silicone obtained from Silicone Elastomer Composition 2 prepared in Preparation Example 2 was evaluated in the same manner as that described in Examples 1 to 3 and Comparative Example 1, with the proviso that the temperature of curing a silicone rubber was 110° C. As a result, the adhesive strength was 47 N/2.5 cm.

Example 12

Preparation of Block Copolymer-Type Polyurethane (2)

A polyurethane-forming reaction was carried out in the same manner as that described in Example 1, with the exception of continuously supplying the alkenyl group-containing diorganopolysiloxane of which both terminals of a molecular chain are capped with hydroxyl groups (POG-2), the polyol (POH-1) containing 10 ppm of tetraisopropyl titanate (TI), 1,4-butanediol (BD) and 4,4'-diphenylmethane diisocyanate (MDI) in a molar ratio of POG-2:POH-1:BD:MDI=0.06: 1.00:2.82:3.77 (content rate of the alkenyl group-containing organopolysiloxane structure in polyurethane block=1.08% by weight, and content rate of nitrogen atom=4.8% by weight) so that the total supplied amount was 100 g/min, to a biaxial screw extruder.

In addition, to the central part of a heating zone of the aforementioned biaxial screw extruder, F-TPS was supplied in 100 g/min, to react with the reaction product obtained by the aforementioned polyurethane-forming reaction. The obtained molten product was continuously extruded in the form of strands in water. Subsequently, the extruded product was cut by means of a pelletizer to obtain pellets. The pellets were subjected to dehumidification for 4 hours at 80° C. Thereby, a mixture containing Block Copolymer-Type Polyurethane (2) was obtained.

The melt viscosity of the obtained mixture was measured in the same manner as that described in Examples 1 to 3 and Comparative Example 1, with the proviso that the measurement temperature was 220° C. As a result, the melt viscosity was 3,700 Pa·s.

From a part of the obtained mixture, a polyurethane which was not the block copolymer-type polyurethane was removed by extraction with dimethylformamide. Subsequently, unreacted TPS-OH and TPS were removed by extraction with cyclohexane. The residual solid content was dried. Thereby, a Block Copolymer-Type Polyurethane (2) was obtained.

As a result of analysis by means of $^1$H-NMR, it can be seen that the obtained Block Copolymer-Type Polyurethane (2) was a diblock copolymer consisting of a block constituted of a unit of POG-2, a unit of POH-1, a unit of BD and a unit of MDI (Polyurethane Block (I)) and a block having a polystyrene-block-hydrogenated poly(isoprene/butadiene)-block-polystyrene type structure (Addition Polymerization-Based Block (II)).

As a result of a GPO analysis, it can be seen that an extract with cyclohexane contained a triblock copolymer possessing one block consisting of a unit of POG-2, a unit of POH-1, a unit of BD and a unit of MDI (Polyurethane Block (I)) and two blocks having a polystyrene block-hydrogenated poly (isoprene/butadiene) block-polystyrene block type structure (Addition Polymerization-Based Block (II)).

With respect to the content rates of the diblock copolymer, the polyurethane which was not the block copolymer-type polyurethane, extracted with dimethylformamide, the TPS-OH, the TPS and the triblock copolymer, extracted with cyclohexane, which were contained in the mixture, in the case of 100% by weight of the aforementioned mixture, the content rate of the diblock copolymer was 35% by weight, the content rate of the polyurethane which was not the block copolymer type polyurethane was 39% by weight, the content rate of the TPS-OH was 0% by weight, the content rate of the TPS was 5% by weight, and the content rate of the triblock copolymer was 21% by weight.

The aforementioned Addition Polymerization-Based Blocks (II) in the aforementioned diblock copolymer and triblock copolymer had the same structure as that of TPS. In addition, the number average molecular weight of the aforementioned diblock copolymer was 114,600.

The invention claimed is:

1. A polyurethane block copolymer having (I) a block derived from a polyurethane comprising polyol units and organic polyisocyanate units, wherein said polyol units contain a polyol unit having an alkenyl group-containing organopolysiloxane structure, and (II) a block derived from an additional block copolymer having (A) a polymer block containing an aromatic vinyl compound unit and (B) a copolymer block containing a conjugated diene unit, or a hydrogen additive of said addition block copolymer, wherein a ratio of said alkenyl group-containing organopolysiloxane structure contained in said block (I) ranges from 0.01 to 20% by weight with respect to the weight of said polyurethane block copolymer.

2. The polyurethane block copolymer according to claim 1, wherein said alkenyl group-containing organopolysiloxane structure is derived from an alkenyl group-containing diorganopolysiloxane of which both terminals of a molecular chain are capped with hydroxyl groups.

3. The polyurethane block copolymer according to claim 2, wherein the hydroxyl groups present at both terminals of said alkenyl group-containing diorganopolysiloxane are silicon atom-bonding hydroxyl groups or hydroxyl groups of silicon atom-bonding carbinol groups.

4. The polyurethane block copolymer according to claim 1, wherein an amount of the alkenyl groups in said alkenyl group-containing organopolysiloxane structure ranges from 1 to 56% by weight.

5. An ink binder comprising the polyurethane block copolymer as recited in claim 1.

6. An ink composition comprising the ink binder as recited in claim 5, a coloring agent, and an organic solvent.

7. A process for manufacturing a composite molded body comprising the steps of supplying a curable silicone composition on the surface of a film formed using the ink composition as recited in claim 6.

8. The ink binder according to claim 5, wherein said polyurethane block copolymer has an amino group in a molecule, and an amine value of said polyurethane block copolymer with respect to 1 g of said polyurethane block copolymer ranges from 0.2 to 20 KOH mg.

9. A master batch comprising the polyurethane block copolymer as recited in claim 1.

10. A thermoplastic polymer composition for molding comprising the polyurethane block copolymer as recited in claim 1, and a thermoplastic polymer other than said polyurethane block copolymer.

11. The thermoplastic polymer composition for molding according to claim 10, wherein said other thermoplastic polymer is a polar polymer.

12. The thermoplastic polymer composition for molding as recited in claim 10, wherein said polyurethane block copolymer has said alkenyl group-containing organopolysiloxane structure in an amount ranging from 0.02 to 3% by weight with respect to weight of said thermoplastic polymer composition for molding.

13. A molded body having a member containing the thermoplastic polymer composition for molding as recited in claim 10.

14. A thermoplastic polymer composition for molding comprising the polyurethane block copolymer as recited in claim 1 and a thermoplastic polymer other than said polyurethane block copolymer, wherein said other thermoplastic polymer is a non-polar polymer.

15. A molded body having a member containing the polyurethane block copolymer as recited in claim 1.

16. The molded body according to claim 15, which is a film or sheet.

17. A composite molded body comprising the molded body as recited in claim 15 and a member containing a silicone, wherein said member containing a silicone contacts a member containing said polyurethane block copolymer of said molded body.

18. A process for manufacturing a composite molded body comprising the steps of supplying a curable silicone composition on the surface of a member formed using the polyurethane block copolymer as recited in claim 1.

19. A process for manufacturing a polyurethane block copolymer comprising reacting a polymer polyol and an organic polyisocyanate, and optionally a chain extender in the presence of (II') a functional group-containing block copolymer by means of a catalyst for a urethane-forming reaction, wherein said functional group-containing block copolymer (II') is a block copolymer having (A) a polymer block containing an aromatic vinyl compound unit and (B) a polymer block containing a conjugated diene unit, or a hydrogen additive of said block copolymer, and is a block copolymer having a functional group reactable with the polymer polyol and/or the organic polyisocyanate, and wherein as at least one part of said polymer polyol and/or chain extender, an alkenyl group-containing diorganopolysiloxane of which both terminals of a molecular chain are capped with hydroxyl groups is used in an amount ranging from 0.01 to 20% by weight with respect to the weight of the obtained polyurethane block copolymer.

20. The process for manufacturing the polyurethane block copolymer according to claim 19, wherein said catalyst for a urethane-forming reaction is at least one compound selected from the group consisting of organic zinc-based compounds, organic bismuth-based compounds, organic titanium-based compounds and organic zirconium-based compounds.

21. An ink binder comprising a polyurethane comprising polyol units and organic polyisocyanate units, wherein said polyol units contain a polyol unit having an alkenyl group-containing organopolysiloxane structure and a ration of said alkenyl group-containing organopolysiloxane structure ranges from 0.01 to 20% by weight with respect to a weight of said polyurethane, wherein said polyurethane has an amino group in a molecule, and an amine value of said polyurethane with respect to 1 g of said polyurethane ranges from 0.2 to 20 KOH mg.

22. An ink composition comprising the ink binder as recited in claim 21, a coloring agent, and an organic solvent.

23. A process for manufacturing a composite molded body comprising the steps of supplying a curable silicone composition on the surface of a film formed using the ink composition as recited in claim 22.

* * * * *